(12) United States Patent
Yoneyama

(10) Patent No.: US 8,295,137 B2
(45) Date of Patent: Oct. 23, 2012

(54) INFORMATION MEDIUM EVALUATING METHOD

(75) Inventor: Kenji Yoneyama, Tokyo (JP)

(73) Assignee: TDK Corporation, Tokyo (JP)

( * ) Notice: Subject to any disclaimer, the term of this patent is extended or adjusted under 35 U.S.C. 154(b) by 1363 days.

(21) Appl. No.: 11/751,193

(22) Filed: May 21, 2007

(65) Prior Publication Data

US 2008/0019231 A1    Jan. 24, 2008

(30) Foreign Application Priority Data

May 22, 2006  (JP) .................. 2006-141639

(51) Int. Cl.
*G11B 7/00*    (2006.01)
(52) U.S. Cl. .................................. 369/53.1
(58) Field of Classification Search ............. 369/53.1, 369/53.12, 53.13; 428/64.1, 64.4, 457
See application file for complete search history.

(56) References Cited

U.S. PATENT DOCUMENTS 6,576,320 B2 * 6/2003 Hayashida et al. .......... 428/64.1
7,484,400 B2   2/2009 Hayashida et al.
2006/0098563 A1 5/2006 Mishima et al.

FOREIGN PATENT DOCUMENTS

| JP | 2002260280 | 9/2002 |
| WO | 2004079733 | 9/2004 |
| WO | 2005/026696 | 3/2005 |

OTHER PUBLICATIONS

English language Abstract of JP 2002-260280.

* cited by examiner

*Primary Examiner* — Nabil Hindi
(74) *Attorney, Agent, or Firm* — Greenblum & Bernstein, P.L.C.

(57) ABSTRACT

An information medium evaluating method includes, in the following order: a recording process that records data onto a recordable information medium to be evaluated; a rubbing process that rubs a processing member against a data recording surface of the information medium; a reading process that reads the data from the information medium; and an evaluating process that evaluates the information medium based on a result of the reading process and evaluation standard data. During the rubbing process, the processing member is rubbed onto only part of a region in a circumferential direction of the information medium.

51 Claims, 10 Drawing Sheets

F I G. 6
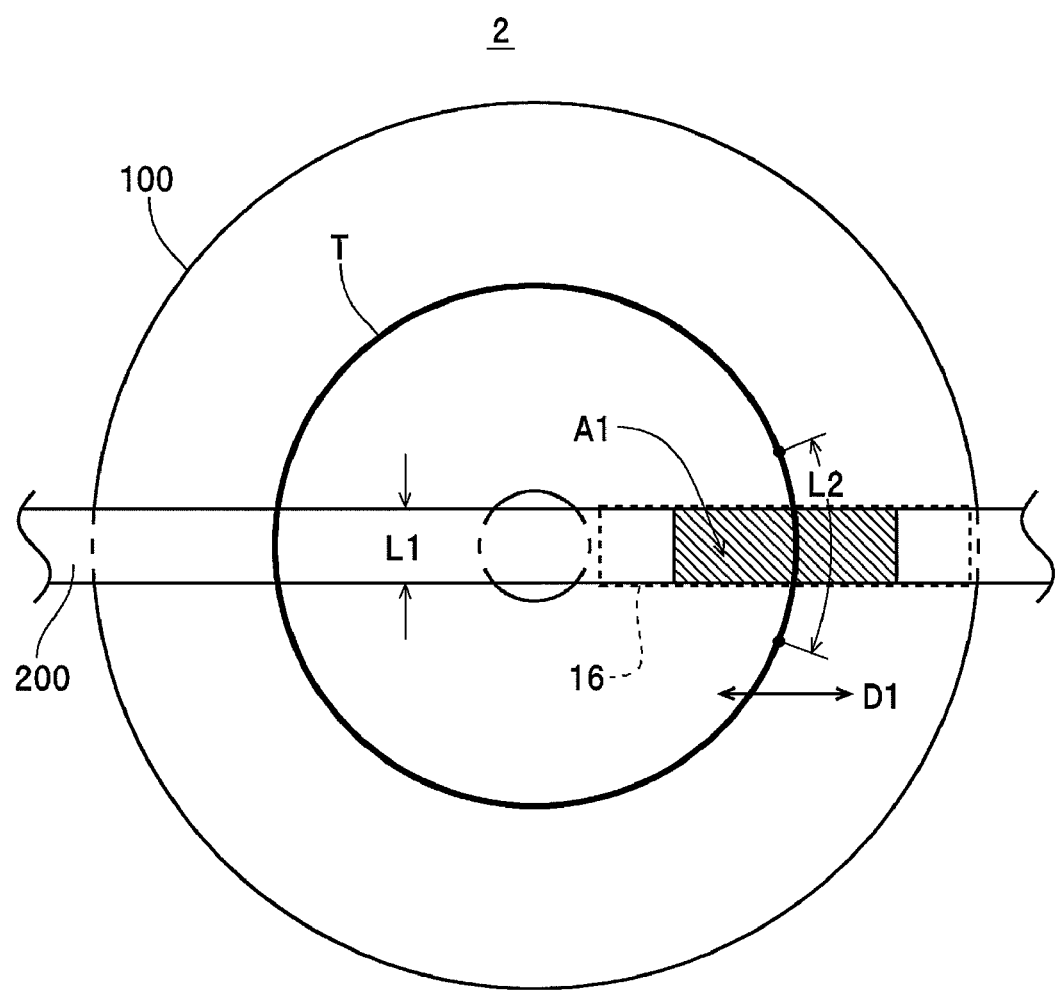

FIG. 7

OPTICAL DISK 100A (100Ax): RECORDING -> RUBBING (RADIAL DIRECTION) -> READING

| TAPE WIDTH OF ABRASIVE TAPE 200 | NUMBER OF OPTICAL DISKS DETERMINED TO BE NON-DEFECTIVE | |
|---|---|---|
| | PROTECTIVE LAYER PRESENT | NO PROTECTIVE LAYER |
| 1mm | 8/10 | 2/10 |
| 2mm | 9/10 | 1/10 |
| 5mm | 10/10 | 0/10 |
| 10mm | 10/10 | 0/10 |
| 20mm | 10/10 | 0/10 |
| 30mm | 10/10 | 0/10 |
| 40mm | 9/10 | 0/10 |
| 50mm | 8/10 | 0/10 |

FIG. 8

OPTICAL DISK 100B (100Bx): RECORDING -> RUBBING (RADIAL DIRECTION) -> READING

| TAPE WIDTH OF ABRASIVE TAPE 200 | NUMBER OF OPTICAL DISKS DETERMINED TO BE NON-DEFECTIVE | |
|---|---|---|
| | PROTECTIVE LAYER PRESENT | NO PROTECTIVE LAYER |
| 1mm | 8/10 | 2/10 |
| 2mm | 9/10 | 1/10 |
| 5mm | 10/10 | 0/10 |
| 10mm | 10/10 | 0/10 |
| 20mm | 10/10 | 0/10 |
| 30mm | 10/10 | 0/10 |
| 40mm | 9/10 | 0/10 |
| 50mm | 8/10 | 0/10 |

FIG. 9

OPTICAL DISK 100C (100Cx): RUBBING (RADIAL DIRECTION) -> READING

| TAPE WIDTH OF ABRASIVE TAPE 200 | NUMBER OF OPTICAL DISKS DETERMINED TO BE NON-DEFECTIVE | |
| --- | --- | --- |
| | PROTECTIVE LAYER PRESENT | NO PROTECTIVE LAYER |
| 1mm | 8/10 | 2/10 |
| 2mm | 9/10 | 1/10 |
| 5mm | 10/10 | 0/10 |
| 10mm | 10/10 | 0/10 |
| 20mm | 10/10 | 0/10 |
| 30mm | 10/10 | 0/10 |
| 40mm | 9/10 | 0/10 |
| 50mm | 8/10 | 0/10 |

FIG. 10

OPTICAL DISK 100A (100Ax): RUBBING (RADIAL DIRECTION) -> RECORDING -> READING

| TAPE WIDTH OF ABRASIVE TAPE 200 | NUMBER OF OPTICAL DISKS DETERMINED TO BE NON-DEFECTIVE | |
| --- | --- | --- |
| | PROTECTIVE LAYER PRESENT | NO PROTECTIVE LAYER |
| 1mm | 8/10 | 2/10 |
| 2mm | 9/10 | 1/10 |
| 5mm | 10/10 | 0/10 |
| 10mm | 10/10 | 0/10 |
| 20mm | 10/10 | 0/10 |
| 30mm | 10/10 | 0/10 |
| 40mm | 9/10 | 0/10 |
| 50mm | 8/10 | 0/10 |

FIG. 11

OPTICAL DISK 100B (100Bx): RUBBING (RADIAL DIRECTION) -> RECORDING -> READING

| TAPE WIDTH OF ABRASIVE TAPE 200 | NUMBER OF OPTICAL DISKS DETERMINED TO BE NON-DEFECTIVE | |
|---|---|---|
| | PROTECTIVE LAYER PRESENT | NO PROTECTIVE LAYER |
| 1mm | 8/10 | 2/10 |
| 2mm | 9/10 | 1/10 |
| 5mm | 10/10 | 0/10 |
| 10mm | 10/10 | 0/10 |
| 20mm | 10/10 | 0/10 |
| 30mm | 10/10 | 0/10 |
| 40mm | 9/10 | 0/10 |
| 50mm | 8/10 | 0/10 |

FIG. 12

| PARTICLE DIAMETER OF PARTICLES OF ABRASIVE TAPE 200 | NUMBER OF OPTICAL DISKS DETERMINED TO BE NON-DEFECTIVE | |
|---|---|---|
| | PROTECTIVE LAYER PRESENT | NO PROTECTIVE LAYER |
| $0.1 \mu m$ | 10/10 | 2/10 |
| $0.3 \mu m$ | 10/10 | 0/10 |
| $1.0 \mu m$ | 10/10 | 0/10 |
| $5.0 \mu m$ | 10/10 | 0/10 |
| $9.0 \mu m$ | 8/10 | Error |

FIG. 14

OPTICAL DISK 100A (100Ax): RECORDING -> RUBBING (TANGENTIAL DIRECTION)
-> READING

| LENGTH IN CIRCUMFERENTIAL DIRECTION OF REGION A12 | NUMBER OF OPTICAL DISKS DETERMINED TO BE NON-DEFECTIVE | |
|---|---|---|
| | PROTECTIVE LAYER PRESENT | NO PROTECTIVE LAYER |
| 10mm | 10/10 | 0/10 |
| 20mm | 10/10 | 0/10 |
| 30mm | 10/10 | 0/10 |
| 40mm | 9/10 | 0/10 |
| 50mm | 8/10 | 0/10 |

FIG. 15

OPTICAL DISK 100B (100Bx): RECORDING -> RUBBING (TANGENTIAL DIRECTION)
-> READING

| LENGTH IN CIRCUMFERENTIAL DIRECTION OF REGION A12 | NUMBER OF OPTICAL DISKS DETERMINED TO BE NON-DEFECTIVE | |
|---|---|---|
| | PROTECTIVE LAYER PRESENT | NO PROTECTIVE LAYER |
| 10mm | 10/10 | 0/10 |
| 20mm | 10/10 | 0/10 |
| 30mm | 10/10 | 0/10 |
| 40mm | 9/10 | 0/10 |
| 50mm | 8/10 | 0/10 |

FIG. 16

OPTICAL DISK 100C (100Cx): RUBBING (TANGENTIAL DIRECTION) -> READING

| LENGTH IN CIRCUMFERENTIAL DIRECTION OF REGION A12 | NUMBER OF OPTICAL DISKS DETERMINED TO BE NON-DEFECTIVE | |
|---|---|---|
| | PROTECTIVE LAYER PRESENT | NO PROTECTIVE LAYER |
| 10mm | 10/10 | 0/10 |
| 20mm | 10/10 | 0/10 |
| 30mm | 10/10 | 0/10 |
| 40mm | 9/10 | 0/10 |
| 50mm | 8/10 | 0/10 |

FIG. 17

OPTICAL DISK 100A (100Ax): RUBBING (TANGENTIAL DIRECTION) -> RECORDING -> READING

| LENGTH IN CIRCUMFERENTIAL DIRECTION OF REGION A12 | NUMBER OF OPTICAL DISKS DETERMINED TO BE NON-DEFECTIVE | |
|---|---|---|
| | PROTECTIVE LAYER PRESENT | NO PROTECTIVE LAYER |
| 10mm | 10/10 | 0/10 |
| 20mm | 10/10 | 0/10 |
| 30mm | 10/10 | 0/10 |
| 40mm | 9/10 | 0/10 |
| 50mm | 8/10 | 0/10 |

FIG. 18

OPTICAL DISK 100B (100Bx): RUBBING (TANGENTIAL DIRECTION) -> RECORDING
-> READING

| LENGTH IN CIRCUMFERENTIAL DIRECTION OF REGION A12 | NUMBER OF OPTICAL DISKS DETERMINED TO BE NON-DEFECTIVE | |
|---|---|---|
| | PROTECTIVE LAYER PRESENT | NO PROTECTIVE LAYER |
| 10mm | 10/10 | 0/10 |
| 20mm | 10/10 | 0/10 |
| 30mm | 10/10 | 0/10 |
| 40mm | 9/10 | 0/10 |
| 50mm | 8/10 | 0/10 |

FIG. 19

| PARTICLE DIAMETER OF PARTICLES OF ABRASIVE TAPE 200 | NUMBER OF OPTICAL DISKS DETERMINED TO BE NON-DEFECTIVE | |
|---|---|---|
| | PROTECTIVE LAYER PRESENT | NO PROTECTIVE LAYER |
| 0.1 μm | 10/10 | 2/10 |
| 0.3 μm | 10/10 | 0/10 |
| 1.0 μm | 10/10 | 0/10 |
| 5.0 μm | 10/10 | 0/10 |
| 9.0 μm | 8/10 | Error |

INFORMATION MEDIUM EVALUATING METHOD

BACKGROUND OF THE INVENTION

1. Field of the Invention

The present invention relates to an information medium evaluating method that reads data after rubbing a processing member onto a data recording surface of an information medium and evaluates the information medium based on the reading result.

2. Description of the Related Art

As one example of this type of information medium evaluating method, in Japanese Laid-Open Patent Publication No. 2002-260280 the present applicant discloses an evaluating method for an optical information medium (an optical disk) that deliberately damages the data recording surface of an optical disk (i.e., the incident surface for a laser beam used for recording and reproducing) and then evaluates the characteristics of the optical disk. In this evaluating method, the optical disk to be evaluated is loaded into a recording/reproducing apparatus (i.e., an optical disk drive) and the data is then reproduced (i.e., the data is read) to measure the BER (Bit Error Rate) for the reproduction signal. Next, an abrasion process that rubs an abrasion wheel (a wheel-shaped grindstone) against the data recording surface of the optical disk in accordance with an abrasion test (a taber abrasion test) standardized according to ISO 9352 is carried out.

More specifically, first, the optical disk to be evaluated is mounted onto the turntable of an abrasion tester with the data recording surface facing upward. Next, the turntable is rotated while pressing the abrasion wheel onto the optical disk on the turntable. When doing so, by rotating the optical disk by rotating the turntable, a ring-shaped region (a region that is concentric with the respective data recording tracks) on the data recording surface of the optical disk becomes damaged due to being rubbed by the abrasion wheel. Next, by loading the optical disk for which the abrasion process has been completed into a recording/reproducing apparatus and reproducing the data (i.e., reading the data), the BER of the reproduction signal is measured. After this, by comparing the measured BER before and after the abrasion process, as examples, optical disks where there is a large change in the BER are evaluated as being optical disks that are susceptible to damage or optical disks whose data becomes difficult to read due to damage. Conversely, optical disks where there is little change in the BER are evaluated as optical disks that are resistant to damage or optical disks whose data can be read even if damage has occurred. In this way, the evaluating process is completed for the optical information media.

SUMMARY OF THE INVENTION

However, by investigating the evaluating method described above, the present inventor found the following issue to be improved. With the evaluating method disclosed by the present applicant, a ring-shaped region on the data recording surface of the optical disk to be evaluated becomes damaged around an entire revolution (i.e., ring-shaped region) of the optical disk by rotating the optical disk while pressing the abrasion wheel onto the data recording surface. Here, one example of how this type of optical disk can be damaged is when the user's hand slips when taking the disk out of its storage case and the user's fingertip or nail contacts the disk, thereby producing a linear scratch on the data recording surface. Another situation is where the data recording surface is damaged by contact between a pickup or the like of a recording/reproducing apparatus and the optical disk, such as when a large shock is applied to the recording/reproducing apparatus during the reading of data. However, in either situation, the data recording surface does not become damaged across a long distance corresponding to one entire revolution of the optical disk and in many cases damage will be produced with a width in a range of several mm to around several tens of mm so as to cut across a number of data recording tracks.

On the other hand, with the evaluating method disclosed by the applicant, as described earlier, the data recording surface is damaged by rubbing the abrasion wheel around one entire revolution of the optical disk, resulting in the risk of it becoming difficult to carry out proper tracking even for optical disks where data can be recorded and reproduced without problems so long as the disks are damaged to an extent that occurs during normal usage. Accordingly, with the evaluating method disclosed by the applicant, there is the risk of optical disks that can be used without problems according to normal usage being evaluated as being susceptible to damage or as being optical disks whose data will be difficult to read due to damage.

The present invention was conceived in view of the issue described above and it is a principal object of the present invention to provide an information medium evaluating method capable of evaluating an information medium in keeping with normal usage.

A first information medium evaluating method according to the present invention includes, in the following order: a recording process that records data onto a recordable information medium to be evaluated; a rubbing process that rubs a processing member against a data recording surface of the information medium; a reading process that reads the data from the information medium; and an evaluating process that evaluates the information medium based on a result of the reading process and evaluation standard data, wherein during the rubbing process, the processing member is rubbed onto only part of a region in a circumferential direction of the information medium. The expression "only part of a region in the circumferential direction" in this specification does not refer to a ring-shaped (i.e., "donut-like") area that is continuous in the circumferential direction but instead refers to an area or areas that partially or fully coincide with a part or parts of a ring-shaped area in the circumferential direction. Accordingly, the external shape or shapes of an area or areas that are "only part of a region in the circumferential direction" do not need to be curved in the circumferential direction of an information medium, and may be a freely chosen shape, such as a rectangle or a circle.

According to this information medium evaluating method, it is possible to produce damage in keeping with normal usage on the recordable information medium to be evaluated. Accordingly, it is possible to properly evaluate whether the recordable information medium to be evaluated is a medium that is susceptible to damage, whether the information medium is a medium where the reading characteristics for the data still satisfy a predetermined standard when damage has occurred, and the like.

A second information medium evaluating method according to the present invention includes, in the following order: a rubbing process that rubs a processing member against a data recording surface of a recordable information medium to be evaluated; a recording process that records data onto the information medium; a reading process that reads the data from the information medium; and an evaluating process that evaluates the information medium based on a result of the reading process and evaluation standard data, wherein during the rubbing process, the processing member is rubbed onto only part of a region in a circumferential direction of the information medium.

According to this information medium evaluating method, it is possible to produce damage in keeping with normal usage on the recordable information medium to be evaluated. Accordingly, it is possible to properly evaluate whether the information medium to be evaluated is a medium that is susceptible to damage, whether the information medium is a medium where the recording characteristics for the data still satisfy a predetermined standard when damage has occurred, and the like.

A third information medium evaluating method according to the present invention includes, in the following order: a rubbing process that rubs a processing member against a data recording surface of a read-only information medium to be evaluated; a reading process that reads data from the information medium; and an evaluating process that evaluates the information medium based on a result of the reading process and evaluation standard data, wherein during the rubbing process, the processing member is rubbed onto only part of a region in a circumferential direction of the information medium.

According to this information medium evaluating method, it is possible to produce damage in keeping with normal usage on the read-only information medium to be evaluated. Accordingly, it is possible to properly evaluate whether the information medium to be evaluated is a medium that is susceptible to damage, whether the information medium is a medium where the reading characteristics for the data still satisfy a predetermined standard when damage has occurred, and the like.

In addition, in the first to third information medium evaluating methods described above, the processing member may be rubbed onto a region to be processed whose length in the circumferential direction is in a range of 5 mm to 30 mm, inclusive as the "only part of a region in the circumferential direction of the information medium". By doing so, it is possible to avoid a situation where fluctuations occur in the extent of rubbing (i.e., the extent of abrasion) due to the width of the processing member being too narrow and to avoid a situation where large noise is superimposed on the tracking error signal during the recording process and/or the reading process due to damage to a wider area than would occur in normal usage, and therefore possible to achieve the reliable recording of the data for evaluation purposes during the recording process and the reliable reading of such data during the reading process. This means that it is possible to properly evaluate whether the information medium to be evaluated is defective or non-defective.

Here, the processing member may be rubbed onto one region to be processed per revolution of the information medium. By doing so, it is possible to avoid a situation where large noise is superimposed on the tracking error signal during the recording process and/or the reading process due to the processing member being rubbed onto a plurality of regions per revolution of the data recording tracks, and therefore possible to achieve the reliable recording of the data for evaluation purposes during the recording process and the reliable reading of such data during the reading process. This means that it is possible to properly evaluate whether the information medium to be evaluated is defective or non-defective.

In addition, in the first to third information medium evaluating methods described above, during the rubbing process, the processing member may be rubbed onto the data recording surface by reciprocally moving at least one of the information medium and the processing member to cause the processing member to move relative to the information medium in a radial direction. By doing so, it is possible to evaluate the information medium in keeping with actual usage of the information medium where damage occurs in a direction that intersects the data recording tracks.

In addition, in the first to third information medium evaluating methods described above, during the rubbing process, the processing member may be rubbed onto the data recording surface by reciprocally moving at least one of the information medium and the processing member to cause the processing member to move relative and tangentially to a data recording track on the information medium. By doing so, it is possible to evaluate the information medium in keeping with actual usage of the information medium where long scratches are produced along the data recording tracks.

In the information medium evaluating methods described above, at least one of the information medium and the processing member may be reciprocally moved relative to one another such that one reciprocal movement over a distance of 30 mm takes one to two seconds, inclusive. By doing so, it is possible to avoid a situation where the reciprocal movement speed is too low and it is not possible to recreate damage in keeping with normal usage, and a situation where the reciprocal movement speed is too high and damage in excess of normal usage is produced.

Also, in the information medium evaluating methods described above, during the rubbing process, at least one of the information medium and the processing member is reciprocally moved in a range of three times to ten times, inclusive. By doing so, it is possible to avoid a situation where the number of reciprocal movements is too low and it is not possible to recreate damage in keeping with normal usage and a situation where the number of reciprocal movements is too high and damage in excess of normal usage is produced.

In the first to third information medium evaluating methods described above, during the rubbing process, the processing member may rub the information medium from below. By doing so, fragments produced during rubbing will naturally fall off the information medium. Accordingly, it is possible to avoid a situation where fluctuations occur in the degree of abrasion between different information media to be evaluated due to the adhesion of fragments.

In the first to third information medium evaluating methods described above, a dry abrasive member including a plurality of particles with a particle diameter in a range of 0.3 μm to 5.0 μm, inclusive may be used as the processing member. By doing so, it is possible to avoid a situation where it is not possible to recreate damage in keeping with normal usage due to a dry abrasive member with particles of excessively small diameter being used and a situation where damage in excess of normal usage is produced due to a dry abrasive member with particles of excessively large diameter being used.

In this case, it is possible to use $Al_2O_3$ as the particles. By doing so, since a dry abrasive member that uses $Al_2O_3$ as particles is inexpensive, it is possible to reduce the cost required to evaluate the information media. Also, since it is easy to obtain a dry abrasive member that includes $Al_2O_3$ as particles, unlike the case where a difficult-to-obtain dry abrasive member is used, it is possible for a large number of users to carry out the rubbing process with the same conditions.

Also, in the rubbing process, a tape-shaped abrasive member may be used as the dry abrasive member and the tape-shaped abrasive member may be fed at a predetermined speed. By doing so, it is possible to prevent the dry abrasive member from becoming clogged due to fragments. Accordingly, it is possible to avoid a situation where there are fluctuations in the degree of abrasion between different information media due to clogging, and therefore it is possible to properly evaluate whether the information media are defective or non-defective.

In addition, the dry abrasive member may be pressed using a roller with a diameter in a range of 40 mm to 60 mm, inclusive, onto the data recording surface. By doing so, it is possible to avoid a situation where the information medium to be evaluated is badly damaged in excess of normal usage due to the dry abrasive member being pressed by a roller with an excessively small diameter and a situation where the roller gets in the way due to the dry abrasive member being pressed by a roller with an excessively large diameter on a small information medium with a diameter in a range of several cm to several tens of cm, which would make it difficult to achieve reciprocal movement over a sufficient distance.

When doing so, a pressing force in a range of 1.0N to 30.0N, inclusive may be applied to the roller in a direction in which the roller presses the dry abrasive member onto the data recording surface. By doing so, it is possible to avoid a situation where it is not possible to recreate damage in keeping with normal usage due to the force applied to the dry abrasive member being too weak and to avoid a situation where the information medium to be evaluated is badly damaged in excess of normal usage due to the force applied to the dry abrasive member being too large.

In addition, in the first to third information medium evaluating methods described above, during the evaluating process, the information medium may be evaluated based on an error rate as the result of the reading process and the evaluation standard data which is for an evaluating process based on such error rate. By doing so, it is possible to suitably evaluate an information medium in keeping with operation of an actual drive apparatus, and as a result, it is possible to accurately and easily determine whether error correction is possible or impossible.

In addition, in the first to third information medium evaluating methods described above, an optical disk where the data recording surface is constructed of a layer of a light transmitting resin formed so as to cover a recording portion for the data may be evaluated as the information medium. By doing so, it is possible to provide high-quality optical disks that will be evaluated as being non-defective when is carried out with conditions in keeping with normal usage.

It should be noted that the disclosure of the present invention relates to a content of Japanese Patent Application 2006-141639 that was filed on May 22, 2006 and the entire content of which is herein incorporated by reference.

BRIEF DESCRIPTION OF THE DRAWINGS

These and other objects and features of the present invention will be explained in more detail below with reference to the attached drawings, wherein:

FIG. 6 is a plan view of an optical disk that is useful in explaining a region rubbed by an abrasive tape;

FIG. 7 is a diagram useful in explaining the relationship between a tape width of the abrasive tape and the evaluation results when a recording process, a rubbing process, a reading process, and an evaluating process are carried out in the mentioned order on the optical disk shown in FIG. 3;

FIG. 8 is a diagram useful in explaining the relationship between the tape width of the abrasive tape and the evaluation results when a recording process, a rubbing process, a reading process, and an evaluating process are carried out in the mentioned order on the optical disk shown in FIG. 4;

FIG. 9 is a diagram useful in explaining the relationship between the tape width of the abrasive tape and the evaluation results when a rubbing process, a reading process, and an evaluating process are carried out in the mentioned order on the optical disk shown in FIG. 5;

FIG. 10 is a diagram useful in explaining the relationship between the tape width of the abrasive tape and the evaluation results when a rubbing process, a recording process, a reading process, and an evaluating process are carried out in the mentioned order on the optical disk shown in FIG. 3;

FIG. 11 is a diagram useful in explaining the relationship between the tape width of the abrasive tape and the evaluation results when a rubbing process, a recording process, a reading process, and an evaluating process are carried out in the mentioned order on the optical disk shown in FIG. 4;

FIG. 12 is a diagram useful in explaining the relationship between the particle diameter of particles of the abrasive tape used during a rubbing process that causes reciprocal movement in a radial direction and the evaluation results;

FIG. 14 is a diagram useful in explaining the relationship between the length in the circumferential direction of the region and the evaluation results when a recording process, a rubbing process, a reading process, and an evaluating process are carried out in the mentioned order on the optical disk shown in FIG. 3;

FIG. 15 is a diagram useful in explaining the relationship between the length in the circumferential direction of the region and the evaluation results when a recording process, a rubbing process, a reading process, and an evaluating process are carried out in the mentioned order on the optical disk shown in FIG. 4;

FIG. 16 is a diagram useful in explaining the relationship between the length in the circumferential direction of the region and the evaluation results when a rubbing process, a reading process, and an evaluating process are carried out in the mentioned order on the optical disk shown in FIG. 5;

FIG. 17 is a diagram useful in explaining the relationship between the length in the circumferential direction of the region and the evaluation results when a rubbing process, a recording process, a reading process, and an evaluating process are carried out in the mentioned order on the optical disk shown in FIG. 3;

FIG. 18 is a diagram useful in explaining the relationship between the length in the circumferential direction of the region and the evaluation results when a rubbing process, a recording process, a reading process, and an evaluating process are carried out in the mentioned order on the optical disk shown in FIG. 4; and FIG. 19 is a diagram useful in explaining the relationship between the particle diameter of particles of the abrasive tape used during a rubbing process that causes reciprocal movement in a tangential direction and the evaluation results.

DESCRIPTION OF THE PREFERRED EMBODIMENTS

Preferred embodiments of an information medium evaluating method according to the present invention will now be described with reference to the attached drawings.

Figure 1:
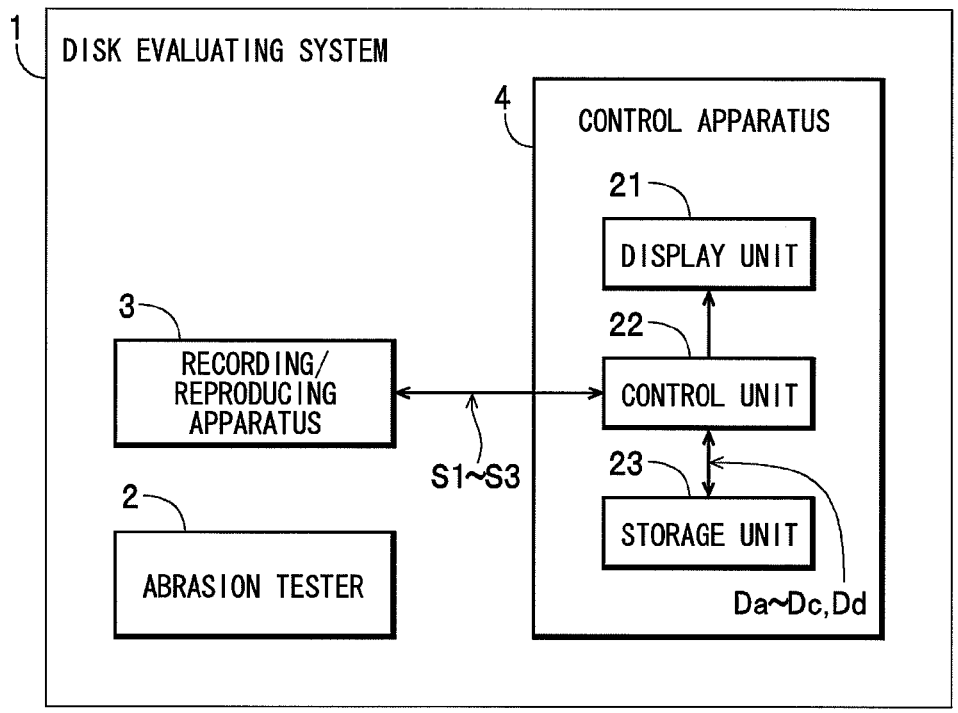
FIG. 1 is a block diagram showing the construction of a disk evaluating system.

A disk evaluating system 1 shown in FIG. 1 is an apparatus for evaluating optical disks 100A to 100C (hereinafter collectively referred to as the "optical disks 100" when no distinction is required) shown in FIGS. 3 to 5 in accordance with the information medium evaluating method according to the present invention. The disk evaluating system 1 includes an abrasion tester 2, a recording/reproducing apparatus 3, and a control apparatus 4. Note that for ease of understanding the present invention, in FIGS. 3 to 5 the ratios of the thicknesses of the various layers constructing the respective optical disks 100 to be evaluated are shown differently to the actual ratios.

Figure 3:
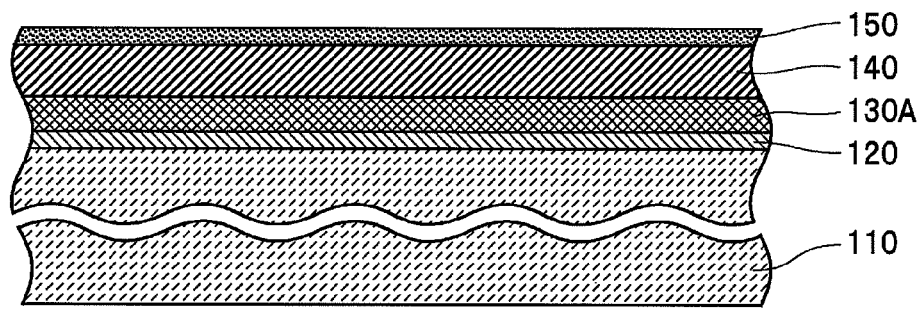
FIG. 3 is a cross-sectional view of an optical disk to be evaluated.

Here, the optical disk 100A is a rewritable optical information medium as one example of a "recordable information medium to be evaluated" for the present invention and as shown in FIG. 3, is constructed of a reflective layer 120, a recording layer 130A, a light-transmitting layer 140, and a protective layer 150 formed in the mentioned order on a disk substrate 110. As one example, the disk substrate 110 is formed by injection molding a resin material such as polycarbonate in a circular plate shape with a diameter of around 120 mm. The disk substrate 110 is not limited to a diameter of around 120 mm and may be around 80 mm in diameter and is not limited to a circular plate shape, and may be formed in a variety of shapes. The reflective layer 120 is formed as a thin film by sputtering a metal material such as aluminum onto the surface of the disk substrate 110.

The recording layer 130A is one example of a "recording portion" for the present invention and as one example is constructed of a layer of a phase-change recording material, such as GeSbTe or AgInSbTe, and a first dielectric layer and a second dielectric layer formed so as to sandwich the layer of recording material (none of such layers are shown). As one example, the light-transmitting layer 140 is formed by applying an acrylic resin by spin coating and then hardening the resin, and is formed with a thickness of around 100 μm. The protective layer 150 is a layer for protecting the data recording surface of the optical disk 100A from damage and as one example is formed by applying a resin material such as polysilazane by spin coating and then hardening the resin material. Note that for the optical disk 100A, the "data recording surface" for the present invention corresponds to the surface on which the protective layer 150 is formed (i.e., the upper surface in FIG. 3).

Figure 4:
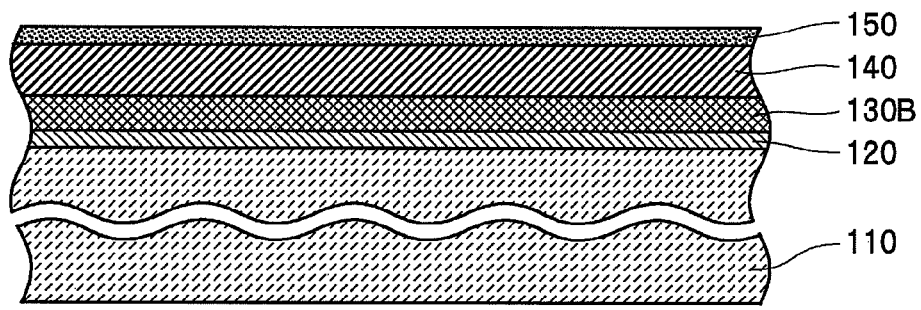
FIG. 4 is a cross-sectional view of another optical disk to be evaluated.

The optical disk 100B is a write-once optical information medium that is another example of a "recordable information medium to be evaluated" for the present invention and as shown in FIG. 4 is constructed with the reflective layer 120, a recording layer 130B, the light-transmitting layer 140, and the protective layer 150 formed in the mentioned order on the disk substrate 110. Note that for the optical disk 100B and the optical disk 100C described later, component elements that have the same functions as the optical disk 100A described above have been assigned the same reference numerals and duplicated description thereof has been omitted. The recording layer 130B is another example of a "recording portion" for the present invention and is constructed of a layer of a recording material, such as a material alloyed using an inorganic material or a dye, and a first dielectric layer and a second dielectric layer formed so as to sandwich the layer of recording material (none of such layers are shown). Note that for the optical disk 100B, the "data recording surface" for the present invention corresponds to the surface on which the protective layer 150 is formed (i.e., the upper surface in FIG. 4).

Figure 5:
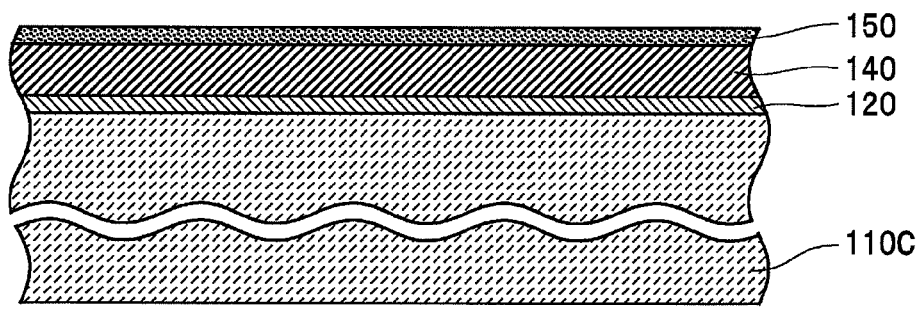
FIG. 5 is a cross-sectional view of yet another optical disk to be evaluated.

In addition, the optical disk 100C is an optical information medium that is an example of a "read-only information medium to be evaluated" for the present invention and as shown in FIG. 5 is constructed with the reflective layer 120, the light-transmitting layer 140, and the protective layer 150 formed in that order on a disk substrate 110C. The disk substrate 110C is formed by injection molding a resin material such as polycarbonate in a circular plate shape and has a large number of pits (recording marks) corresponding to data formed in one surface thereof (the upper surface in FIG. 5) during injection molding. Note that for the optical disk 100C, the "data recording surface" for the present invention corresponds to the surface on which the protective layer 150 is formed (the upper surface in FIG. 5). For the optical disk 100C, the surface of the disk substrate 110C (i.e., the surface in which the plurality of pits are formed) corresponds to the "recording portion" for the present invention.

On the other hand, the abrasion tester 2 is an apparatus for carrying out a rubbing process on the optical disk 100 described above and as shown in FIG. 2, includes a disk holding part 2a, a tape pressing part 2b, and a moving mechanism 2c. The disk holding part 2a holds the optical disk 100 to be evaluated above the tape pressing part 2b in a state where the data recording surface faces downward. The tape pressing part 2b includes an arm 13 disposed on a base 11 via a support 12, a weight 14 that is attached to the arm 13 so as to be slidable in the direction of the arrow A, a roller attaching part 15 that is coupled to one end of the arm 13, a roller 16 for pressing an abrasive tape 200 onto the data recording surface of the optical disk 100, a tape feeding mechanism 17 for feeding the abrasive tape 200, and a control unit (not shown).

The abrasion tester 2 uses a construction where the force that presses the abrasive tape 200 onto the optical disk 100 using the roller 16 (i.e., the pressing force applied to a rotation shaft 16a of the roller 16 in the direction of the arrow B) can be adjusted by sliding the weight 14 in the direction of the arrow A on the arm 13 to adjust the distance from the support 12 to the weight 14. More specifically, the abrasion tester 2 is constructed so that a pressing force in a range of 1.0N to 30.0N (as one example, 5.0N) can be applied in the direction of the arrow B to the rotation shaft 16a of the roller 16. Also, by changing the number and weight of the weights 14 attached to the arm 13, it is possible to apply the pressing force beyond the range described above to the rotation shaft 16a of the roller 16. Note that the pressing force applied to the roller 16 is not limited to the example described above and it is possible to appropriately adjust the width and the diameter of the roller 16 in accordance with factors such as the material of the abrasive tape 200.

The roller 16 is formed of a metal material (as one example, stainless steel) whose width is 10 mm and whose diameter is 50 mm. The width of the roller 16 can be changed as appropriate in accordance with a tape width L1 (see FIG. 6) of the abrasive tape 200 being used. On the other hand, the diameter of the roller 16 should preferably be in a range of 40 mm to 60 mm, inclusive. When the diameter of the roller 16 is below 40 mm, there is the risk of the optical disk 100 being excessively damaged due to the reduction in the contact area between the abrasive tape 200 and the optical disk 100. Conversely, when the diameter of the roller 16 exceeds 60 mm, there is the risk of it being difficult to cause a small optical disk 100 whose diameter is around 120 mm to move reciprocally with the abrasive tape 200 in contact with the optical disk 100 (i.e., the large roller 16 obstructs such movement).

The tape feeding mechanism 17 feeds the abrasive tape 200 in the direction of the arrow C. With the abrasion tester 2, as one example, whenever the moving mechanism 2c linearly moves the disk holding part 2a reciprocally once in the direction of the arrow D1 (i.e., in the radial direction of the optical disk 100) as described later, the tape feeding mechanism 17 feeds the abrasive tape 200 by a length that corresponds to a 0.9-degree rotation of the roller 16 (one example of a "predetermined speed" for the present invention). Accordingly, it is possible to rub a new abrasive surface of the abrasive tape 200 onto the optical disk 100 to be evaluated during each reciprocal movement without the same part of the abrasive tape 200 being rubbed onto the optical disk 100 a plurality of times. Note that the speed at which the abrasive tape 200 is fed is not limited to the example described above and it is possible to change the speed as appropriate so that the abrasive tape 200 does not become clogged during the pressing process described later. The abrasion tester 2 is also not limited to a construction that feeds tape for each reciprocal movement and it is possible to use a construction that constantly feeds the abrasive tape 200 in the direction of the arrow C at an extremely low speed.

The abrasive tape 200 is one example of a dry abrasive member (a tape-shaped abrasive member) as a "processing member" for the present invention and includes abrasive particles with a particle diameter of around 0.6 μm. More specifically, as one example, $Al_2O_3$ with a particle diameter of 0.6 μm as one example of the "particles" for the present invention is applied using an adhesive binder onto one surface of a base tape (a belt-shaped support) with a width of 10 mm. It is possible to use an abrasive tape 200 that includes various types of particles such as SiC, $Cr_2O_3$, $SiO_2$, $Fe_2O_3$, $CeO_2$, or C (diamond) in place of $Al_2O_3$. To recreate damage that occurs during normal usage of the optical disks 100 or the like described above, it is preferable to use a member with particles (in this example, $Al_2O_3$) with a particle diameter in a range of 0.3 μm to 5.0 μm, inclusive (i.e., an abrasive tape in a range of #15000 to #3000, inclusive) as the abrasive tape 200. Note that the relationship between the particle diameter of the particles and the evaluation results for the optical disks 100 are described in detail later in this specification.

The abrasion tester 2 is constructed so as to rub the abrasive tape 200 against the optical disk 100 held by the disk holding part 2a from below. Accordingly, since fragments produced when the abrasive tape 200 is rubbed (here, "fragments" refers to particles ground off the optical disk 100 and abrasion powder such as particles and the like that has become detached from the abrasive tape 200) fall off without remaining on the data recording surface of the optical disk 100, a situation where the extent of abrasion changes between different optical disks 100 being evaluated due to the presence of such fragments is avoided.

The moving mechanism 2c moves the disk holding part 2a reciprocally in the direction of the arrow D1 with respect to the tape pressing part 2b to rub the optical disk 100 against the abrasive tape 200 (or rub the abrasive tape 200 against the optical disk 100). Here, the moving mechanism 2c reciprocally moves the disk holding part 2a (i.e., the optical disk 100) so that the speed of relative movement (in this case, reciprocal movement) between the optical disk 100 and the abrasive tape 200 is such that a reciprocal movement over a distance of 30 mm takes between one and two seconds, inclusive (as one example, one reciprocal movement takes 1.5 seconds). During the rubbing process described later, the moving mechanism 2c reciprocally moves the disk holding part 2a (or the optical disk 100: one example of "at least one out of the information medium and the processing member" for the present invention) with respect to the tape pressing part 2b (i.e., the abrasive tape 200) in a range of three times to ten times, inclusive (as one example, five times).

The recording/reproducing apparatus 3 is a disk drive that is constructed so as to be capable of recording data on the optical disks 100A and 100B and of reading data from the optical disks 100A to 100C and, in accordance with a control signal S1 outputted from the control apparatus 4, carries out the recording of data based on a recording signal S2 and the outputting of a reproduction signal S3 based on the data read from the optical disk 100. As shown in FIG. 1, the control apparatus 4 includes a display unit 21, a control unit 22, and a storage unit 23. The display unit 21 displays evaluation results and the like for the optical disks 100 in accordance with control by the control unit 22. The control unit 22 controls the recording/reproducing apparatus 3 to have data recorded (i.e., carries out a "recording process" for the present invention) and to have recorded data read from the optical disk 100 (i.e., carries out a "reading process" for the present invention). The control unit 22 evaluates whether each optical disk 100 is defective or non-defective based on the reproduction signal S3 outputted from the recording/reproducing apparatus 3 and evaluation standard data Da to Dc stored in the storage unit 23 (i.e., the control unit 22 caries out an "evaluating process" for the present invention).

Next, a method of evaluating the optical disk 100 using the disk evaluating system 1 will be described with reference to the drawings.

First, the optical disks 100A, 100B, and 100C described earlier and optical disks 100A, 100B, and 100C on which the protective layer 150 is not formed are prepared (hereinafter, the optical disks on which the protective layer 150 is not formed are referred to as the "optical disks 100Ax, 100Bx, and 100Cx"). Here, the optical disks 100A to 100C are examples of non-defective optical disks for which the recording and reading of data are not hindered when the disk is damaged to an extent that occurs during normal usage. The optical disks 100Ax to 100Cx (hereinafter collectively referred to as the "optical disks 100x" when no distinction is required") are examples of optical disks where there is the risk that the recording or reading of data will be difficult due to damage of an extent that occurs during normal usage.

Next, the respective optical disks 100 and 100x described above are evaluated in accordance with the information medium evaluating method according to the present invention. When doing so, to evaluate the reading characteristics for data due to damage to the data recording surface, the rubbing process for the present invention is carried out on the respective optical disks 100 and 100x in a state where the data has already been recorded, and after this, the reading process and the evaluating process for the present invention are carried out in the mentioned order.

For the recordable optical disks 100A, 100Ax, 100B, and 100Bx, the recording process for the present invention is carried out before the rubbing process. More specifically, the optical disk 100A, for example, is loaded into the recording/reproducing apparatus 3 and the start of the recording process is designated. At this point, the control unit 22 of the control apparatus 4 generates the recording signal S2 based on the evaluation recording data Dd used for evaluation that is stored in the storage unit 23 and outputs the recording signal S2 together with the control signal S1 to the recording/reproducing apparatus 3. In response, the recording/reproducing apparatus 3 carries out the recording process for the evaluation recording data Dd on the optical disk 100A based on the recording signal S2. In the same way, the recording process for the evaluation recording data Dd is carried out on the optical disks 100Ax, 100B, and 100Bx. Note that it is assumed that the evaluation recording data Dd described above has already been recorded on the optical disks 100C and 100Cx by having pits formed in the disk substrate 110C during manufacturing.

Figure 2:
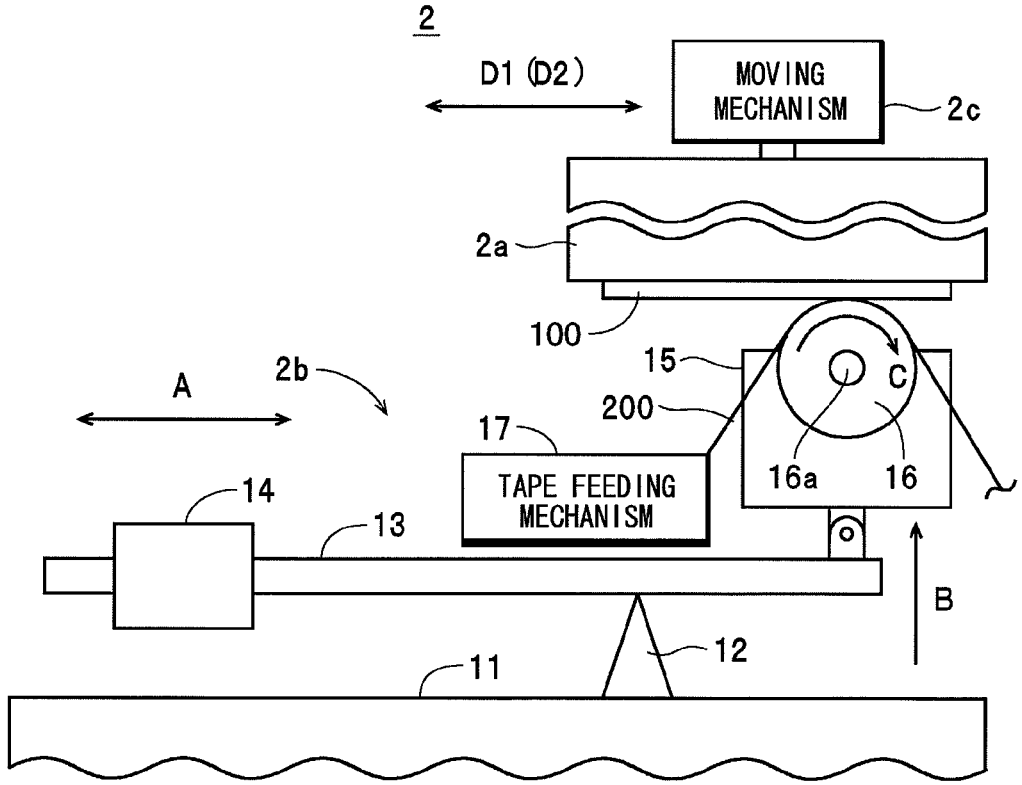
FIG. 2 is a diagram showing the construction of an abrasion tester.

Next, the rubbing process for the present invention is carried out by the abrasion tester 2 on the respective optical disks 100 and 100x. When doing so, as shown in FIG. 2, the optical disk 100A for example is held by the disk holding part 2a with the data recording surface facing downward. Next, the weight 14 is slid on the arm 13 to adjust the pressing force so that 5.0N is applied to the rotation shaft 16a of the roller 16 in the direction of the arrow B. By doing so, the abrasive tape 200 is pressed onto the data recording surface of the optical disk 100A held by the disk holding part 2a with a pressing force of 5.0N. When doing so, as shown in FIG. 6, as one example, the abrasive tape 200 is placed in contact with a data recording track T in a central periphery out of the plurality of data recording tracks on the optical disk 100A.

Next, the moving mechanism 2c reciprocally moves the disk holding part 2a (i.e., the optical disk 100A) with respect to the tape pressing part 2b (i.e., the abrasive tape 200) in the direction of the arrow D1 (i.e., in the radial direction of the optical disk 100A). When doing so, the moving mechanism 2c reciprocally moves the disk holding part 2a (the optical disk 100A) five times at a speed where the disk holding part 2a reciprocally moves once over a distance of 30 mm in 1.5 seconds. The tape feeding mechanism 17 feeds the abrasive tape 200 at a speed whereby the roller 16 is caused to rotate by 9 degrees per reciprocal movement of the disk holding part 2a by the moving mechanism 2c. By doing so, whenever the optical disk 100A reciprocally moves against the abrasive tape 200, a new abrasive surface of the abrasive tape 200 will rub against the data recording surface of the optical disk 100A. As a result, as shown in FIG. 6, the abrasive tape 200 is rubbed against a rectangular region A1 (one example of a "region to be processed" for the present invention) that has a length in the radial direction of 30 mm and a width of 10 mm that is equal to the tape width L1 of the abrasive tape 200.

The abrasion tester 2 uses a construction where the abrasive tape 200 rubs against the optical disk 100A to be evaluated from below. Accordingly, fragments produced by rubbing the abrasive tape 200 against the optical disk 100A (i.e., particles ground off the optical disk 100A by rubbing with the abrasive tape 200 and the $Al_2O_3$ that has become detached from the base tape due to rubbing onto the optical disk 100A) fall off without adhering to the data recording surface of the optical disk 100A (i.e., the surface rubbed by the abrasive tape 200). By doing so, a situation where the extent of abrasion of the data recording surface changes between the respective optical disks 100 and 100x being evaluated due to differences in the amount of fragments produced during the rubbing process is avoided. By carrying out the above operations, the rubbing process on the optical disk 100A is completed. After this, the rubbing process is carried out on the optical disks 100Ax, 100B, 100Bx, 100C, and 100Cx in the same way as for the optical disk 100A described above.

Next, the reading process that reads the evaluation recording data Dd using the recording/reproducing apparatus 3 from the respective optical disks 100 and 100x for which the rubbing process has been completed and the evaluating process that evaluates the respective optical disks 100 and 100x based on the result of the reading process by the recording/reproducing apparatus 3 (i.e., the reading result) are carried out. More specifically, a start of processing is designated in a state where the optical disk 100A, for example, has been loaded into the recording/reproducing apparatus 3. When doing so, the control apparatus 4 (the control unit 22) outputs the control signal S1 to the recording/reproducing apparatus 3 to start the reading process.

Here, in the disk evaluating system 1, during the rubbing process that rubs the abrasive tape 200 using the abrasion tester 2 described earlier, the abrasive tape 200 is rubbed onto one region A1 per revolution of the optical disk 100A with a length of around 10 mm along the circumferential direction of the optical disk 100A (in this example, a length in a tangential direction for the data recording track T: a length corresponding to the tape width L1 of the abrasive tape 200: one example in a range of 5 mm to 30 mm, inclusive for the present invention). Accordingly, unlike the conventional evaluating method that rubs an abrasion wheel for an entire revolution of the optical disk to be evaluated, it is possible to read the evaluation recording data Dd without a situation occurring where tracking on the optical disk 100A is no longer possible after the rubbing process. Therefore, the recording/reproducing apparatus 3 generates the reproduction signal S3 based on the evaluation recording data Dd read from the data recording track T in the central periphery of the optical disk 100A and outputs the generated reproduction signal S3 to the control unit 22 of the control apparatus 4. Note that although the length in the circumferential direction of the region A1 described above and the tape width L1 of the abrasive tape 200 are such that the tape width L1 is slightly shorter in reality, these two dimensions are treated as being equal in the present specification.

In response, the control unit 22 finds the SER (Symbol Error Rate: one example of the error rate) based on the reproduction signal S3 outputted from the recording/reproducing apparatus 3 and evaluates the reading characteristics (reproduction characteristics) for the data of the optical disk 100A after the rubbing process based on the calculated SER and the evaluation standard data Da (the evaluation standard data for the rewritable optical disks 100A and 100Ax) stored in the storage unit 23. Here, the evaluation standard data Da is composed of a threshold so that when the SER is below a predetermined standard value, the optical disks 100A and 100Ax are evaluated as non-defective and when the SER is equal to or above the predetermined standard value, the optical disks 100A and 100Ax are evaluated as defective. Accordingly, the control unit 22 determines whether the SER calculated based on the reproduction signal S3 is below the predetermined standard value (or in other words, whether the SER is equal to or above a predetermined standard value) and the reading characteristics (reproduction characteristics) of the optical disk 100A are evaluated based on the determination result. Note that the SER described above is found as a prescribed value out of an average SER for a predetermined period and a maximum SER within a predetermined period.

The SER of the optical disk 100A, on which the protective layer 150 is formed and which is therefore resistant to damage, is below the standard value. Accordingly, the control unit 22 evaluates the optical disk 100A as a medium that is resistant to damage or a medium from which data can be read even when damage has occurred and displays a message showing the same on the display unit 21. By doing so, the evaluating of the optical disk 100A is completed. Next, in the same way as the optical disk 100A described above, the reading process and evaluating process are carried out for the optical disk 100Ax. When doing so, the SER of the optical disk 100Ax, on which the protective layer 150 is not formed and which is therefore susceptible to damage, is equal to or above the standard value. Accordingly, the control unit 22 evaluates the optical disk 100Ax as a medium that is susceptible to damage or a medium from which data is difficult to read when damage has occurred and displays a message showing the same on the display unit 21. By doing so, the evaluating of the optical disk 100Ax is completed.

After this, in the same way as the optical disks 100A and 100Ax described above, the reading process for the evaluation recording data Dd and evaluating process are carried out for the optical disks 100B, 100Bx, 100C, and 100Cx. During the evaluating process for the optical disks 100B and 100Bx, the evaluation standard data Db (evaluation standard data for the write-once optical disks 100B and 100Bx) is used instead of the evaluation standard data Da described above. Similarly, during the evaluating process for the optical disks 100C and 100Cx, the evaluation standard data Dc (evaluation standard data for the read-only optical disks 100C and 100Cx) is used instead of the evaluation standard data Da described above. By doing so, the optical disks 100B and 100C on which the protective layer 150 is formed are evaluated as media that are resistant to damage or media from which data can be read even when damage has occurred and the optical disks 100Bx and 100Cx on which the protective layer 150 is not formed are evaluated as media that are susceptible to damage or media from which data is difficult to read when damage has occurred. In this way, the evaluating of the respective optical disks 100A, 100Ax, 100B, and 100Bx by a first information medium evaluating method according to the present invention and the evaluating of the respective optical disks 100C and 100Cx by a third information medium evaluating method according to the present invention are completed.

On the other hand, when evaluating the recording characteristics for data due to damage on the data recording surface for the recordable optical disks 100A, 100Ax, 100B, and 100Bx, a second information medium evaluating method is carried out where the rubbing process for the present invention is carried out on the optical disks 100A, 100Ax, 100B, and 100Bx in a state where data is yet to be recorded and then the recording process, the reading process, and the evaluating process for the present invention are carried out in the mentioned order. More specifically, the abrasive tape 200 is rubbed against the respective optical disks 100A, 100Ax, 100B, and 100Bx according to the same procedure and the same conditions as the rubbing process described above. As a result, as shown in FIG. 6, the abrasive tape 200 is rubbed against a rectangular region A1 (one example of the "region to be processed" for the present invention) whose length in the radial direction is 30 mm and whose width is equal to the tape width L1 of the abrasive tape 200 at 10 mm on each of the optical disks 100A, 100Ax, 100B, and 100Bx.

Next, the recording process is carried out for each of the optical disks 100A, 100Ax, 100B, and 100Bx for which the rubbing process has been completed. When doing so, the evaluation recording data Dd is recorded onto the respective optical disks 100A, 100Ax, 100B, and 100Bx according to the same procedure and the same conditions as the recording process described above. In the disk evaluating system 1, during the rubbing process that rubs the abrasive tape 200 using the abrasion tester 2 described earlier, the abrasive tape 200 is rubbed onto one region A1 per revolution of the optical disk 100A with a length in the circumferential direction of the optical disk 100A of around 10 mm (a length corresponding to the tape width L1 of the abrasive tape 200: one example of a value in the range of 5 mm to 30 mm, inclusive for the present invention). Accordingly, unlike the conventional evaluating method that rubs an abrasion wheel around an entire revolution of the optical disk to be evaluated, it will be possible to record the evaluation recording data Dd without a situation occurring where tracking cannot be carried out for the optical disks 100 and 100x after the rubbing process.

Next, the reading process that reads the evaluation recording data Dd from the respective optical disks 100A, 100Ax, 100B, and 100Bx for which the recording process has been completed and the evaluating process for the respective optical disks 100A, 100Ax, 100B, and 100Bx based on the results (i.e., reading results) of the reading process by the recording/reproducing apparatus 3 are carried out. When doing so, the evaluation recording data Dd is read from the optical disks 100A, 100Ax, 100B, and 100Bx according to the same procedure and the same conditions as the reading process described earlier and the recording characteristics (reproduction characteristics) of the optical disks 100A, 100Ax, 100B, and 100Bx are evaluated according to the same procedure and the same conditions as the evaluating process described earlier When doing so, the SER of the optical disks 100A and 100B on which the protective layer 150 is formed and which are therefore resistant to damage is below the standard value. Accordingly, the control unit 22 evaluates the optical disks 100A and 100B as media that are resistant to damage or media on which data can be recorded even when damage has occurred, and displays a message showing the same on the display unit 21. On the other hand, the SER of the optical disks 100Ax and 100Bx on which the protective layer 150 is not formed and which are therefore susceptible to damage is equal to or above the standard value. Accordingly, the control unit 22 evaluates the optical disks 100Ax and 100Bx as media that are susceptible to damage or media onto which data is difficult to record when damage has occurred, and displays a message showing the same on the display unit 21. By doing so, the evaluating of the optical disks 100A, 100Ax, 100B, and 100Bx (i.e., the evaluating of the respective optical disks 100 and 100x according to the second information medium evaluating method according to the present invention) is completed.

Next, the relationship between the length in the circumferential direction (in this example, the length in the tangential direction for the data recording track T) of the region A1 rubbed by the abrasive tape 200 during the rubbing process for the present invention and the evaluation results for the optical disks 100 and 100x will be described with reference to the drawings.

Since as described earlier, the abrasive tape 200 is rubbed onto only part of a region in the circumferential direction (i.e., along the data recording tracks) of the respective optical disks 100 and 100x to be evaluated, unlike the conventional method where the abrasion wheel is rubbed for an entire revolution of the optical disk to be evaluated, it is possible to record the evaluation recording data Dd and to read the evaluation recording data Dd without a situation occurring where tracking is not possible during the recording process and/or the reading process. Here, the present applicant found that it is preferable for the length in the circumferential direction (i.e., the length in the tangential direction for the data recording track T) of the region A1 rubbed by the abrasive tape 200 during the rubbing process for the present invention to be in a range of 5 mm to 30 mm, inclusive.

More specifically, when the tape width L1 of the abrasive tape 200 used during the rubbing process was changed to change the length in the circumferential direction of the region A1 for the case where the recording process, the rubbing process, the reading process, and the evaluating process were carried out in the mentioned order on the optical disk 100A described above, for example, as shown in FIG. 7, it was possible to evaluate ten optical disks 100A as all being non-defective and to evaluate ten optical disks 100Ax as all being defective when the tape width L1 of the abrasive tape 200 (that is, the length in the circumferential direction of the region A1) was in a range of 5 mm to 30 mm, inclusive. On the other hand, when the tape width L1 (the length in the circumferential direction of the region A1) was set at 2 mm, one out of the ten optical disks 100A was erroneously evaluated as defective and one out of the ten optical disks 100Ax was erroneously evaluated as non-defective. Similarly, when the tape width L1 (the length in the circumferential direction of the region A1) was set at 1 mm, two out of the ten optical disks 100A were erroneously evaluated as defective and two out of the ten optical disks 100Ax were erroneously evaluated as non-defective. On the other hand, when the tape width L1 (the length in the circumferential direction of the region A1) was set at 40 mm, all of the optical disks 100Ax were evaluated as defective but one out of the ten optical disks 100A was erroneously evaluated as defective. Similarly, when the tape width L1 (the length in the circumferential direction of the region A1) was set at 50 mm, all of the optical disks 100Ax were evaluated as defective but two out of the ten optical disks 100A were erroneously evaluated as defective.

Similarly, when the length in the circumferential direction of the region A1 was changed for the case where the recording process, the rubbing process, the reading process, and the evaluating process were carried out in the mentioned order on the optical disk 100B described above, as shown in FIG. 8, it was possible to evaluate ten optical disks 100B as all being non-defective and to evaluate ten optical disks 100Bx as all being defective when the tape width L1 of the abrasive tape 200 (that is, the length in the circumferential direction of the region A1) was in a range of 5 mm to 30 mm, inclusive. On the other hand, when the tape width L1 (the length in the circumferential direction of the region A1) was set at 2 mm, one out of the ten optical disks 100B was erroneously evaluated as defective and one out of the ten optical disks 100Bx was erroneously evaluated as non-defective. Similarly, when the tape width L1 (the length in the circumferential direction of the region A1) was set at 1 mm, two out of the ten optical disks 100B were erroneously evaluated as defective and two out of the ten optical disks 100Bx were erroneously evaluated as non-defective. On the other hand, when the tape width L1 (the length in the circumferential direction of the region A1) was set at 40 mm, all of the optical disks 100Bx were evaluated as defective but one out of the ten optical disks 100B was erroneously evaluated as defective. Similarly, when the tape width L1 (the length in the circumferential direction of the region A1) was set at 50 mm, all of the optical disks 100Bx were evaluated as defective but two out of the ten optical disks 100B were erroneously evaluated as defective.

In addition, when the length in the circumferential direction of the region A1 was changed for the case where the rubbing process, the reading process, and the evaluating process were carried in the mentioned order on the optical disk 100C described above, as shown in FIG. 9, it was possible to evaluate ten optical disks 100C as all being non-defective and to evaluate ten optical disks 100Cx as all being defective when the tape width L1 of the abrasive tape 200 (that is, the length in the circumferential direction of the region A1) was in a range of 5 mm to 30 mm, inclusive. On the other hand, when the tape width L1 (the length in the circumferential direction of the region A1) was set at 2 mm, one out of the ten optical disks 100C was erroneously evaluated as defective and one out of the ten optical disks 100Cx was erroneously evaluated as non-defective. Similarly, when the tape width L1 (the length in the circumferential direction of the region A1) was set at 1 mm, two out of the ten optical disks 100C were erroneously evaluated as defective and two out of the ten optical disks 100Cx were erroneously evaluated as non-defective. On the other hand, when the tape width L1 (the length in the circumferential direction of the region A1) was set at 40 mm, all of the optical disks 100Cx were evaluated as defective but one out of the ten optical disks 100C was erroneously evaluated as defective. Similarly, when the tape width L1 (the length in the circumferential direction of the region A1) was set at 50 mm, all of the optical disks 100Cx were evaluated as defective but two out of the ten optical disks 100C were erroneously evaluated as defective.

Also, when the length in the circumferential direction of the region A1 described above was changed for the case where the rubbing process, the recording process, the reading process, and the evaluating process were carried out in the mentioned order on the optical disk 100A described above, as shown in FIG. 10, it was possible to evaluate ten optical disks 100A as all being non-defective and to evaluate ten optical disks 100Ax as all being defective when the tape width L1 of the abrasive tape 200 (that is, the length in the circumferential direction of the region A1) was in a range of 5 mm to 30 mm, inclusive. On the other hand, when the tape width L1 (the length in the circumferential direction of the region A1) was set at 2 mm, one out of the ten optical disks 100A was erroneously evaluated as defective and one out of the ten optical disks 100Ax was erroneously evaluated as non-defective. Similarly, when the tape width L1 (the length in the circumferential direction of the region A1) was set at 1 mm, two out of the ten optical disks 100A were erroneously evaluated as defective and two out of the ten optical disks 100Ax were erroneously evaluated as non-defective. On the other hand, when the tape width L1 (the length in the circumferential direction of the region A1) was set at 40 mm, all of the optical disks 100Ax were evaluated as defective but one out of the ten optical disks 100A was erroneously evaluated as defective. Similarly, when the tape width L1 (the length in the circumferential direction of the region A1) was set at 50 mm, all of the optical disks 100Ax were evaluated as defective but two out of the ten optical disks 100A were erroneously evaluated as defective.

In addition, when the length in the circumferential direction of the region A1 described above was changed for the case where the rubbing process, the recording process, the reading process, and the evaluating process were carried out in the mentioned order on the optical disk 100B described above, as shown in FIG. 11, it was possible to evaluate ten optical disks 100B as all being non-defective and to evaluate ten optical disks 100Bx as all being defective when the tape width L1 of the abrasive tape 200 (that is, the length in the circumferential direction of the region A1) was in a range of 5 mm to 30 mm, inclusive. On the other hand, when the tape width L1 (the length in the circumferential direction of the region A1) was set at 2 mm, one out of the ten optical disks 100B was erroneously evaluated as defective and one out of the ten optical disks 100Bx was erroneously evaluated as non-defective. Similarly, when the tape width L1 (the length in the circumferential direction of the region A1) was set at 1 mm, two out of the ten optical disks 100B were erroneously evaluated as defective and two out of the ten optical disks 100Bx were erroneously evaluated as non-defective. On the other hand, when the tape width L1 (the length in the circumferential direction of the region A1) was set at 40 mm, all of the optical disks 100Bx were evaluated as defective but one out of the ten optical disks 100B was erroneously evaluated as defective. Similarly, when the tape width L1 (the length in the circumferential direction of the region A1) was set at 50 mm, all of the optical disks 100Bx were evaluated as defective but two out of the ten optical disks 100B were erroneously evaluated as defective.

When the tape width L1 of the abrasive tape 200 used during the rubbing process is narrow, the areas of the respective optical disks 100 and 100x rubbed by the abrasive tape 200 are also narrow, and it is believed that fluctuations are caused in the extent of abrasion even though the pressing force applied to the abrasive tape 200 by the tape pressing part 2b (i.e., the magnitude of the force applied to the rotation shaft 16a of the roller 16 in the direction of the arrow B in FIG. 2) is constant. Accordingly, a situation occurs where damage is produced on the optical disks 100 that are resistant to damage due to the protective layer 150 being formed and where large damage is not produced on the optical disks 100x that are susceptible to damage due to the protective layer 150 not being formed, which leads to the erroneous evaluating of around one or two disks. For this reason, it is preferable to set the length in the circumferential direction of the region A1 at 5 mm or above to make it possible to carry out the rubbing process using an abrasive tape 200 (a "processing member": here, a dry abrasive member) of at least a sufficient width.

On the other hand, when the tape width L1 of the abrasive tape 200 used during the rubbing process is wide, it is believed that tracking errors will occur during the recording process or the reading process due to the increase in the length in the circumferential direction (i.e., the length along the data recording track T) of the region A1. For this reason, it is preferable to set the length in the circumferential direction of the region A1 (i.e., the length of the region A1 along the data recording track T for which the recording process and reading process are carried out) at the length L2 (30 mm) in FIG. 6 or below.

Next, the relationship between the particle diameter of the particles of the abrasive tape 200 and the evaluation results for the optical disks 100 and 100x for the case where the processing member and the information medium are reciprocally moved in the radial direction during the rubbing process for the present invention will be described with reference to the drawings.

As described earlier, by rubbing the abrasive tape 200 that has particles with a particle diameter in a range of 0.3 μm to 5.0 μm, inclusive (in this example, $Al_2O_3$ with a particle diameter of 0.6 μm) onto the optical disks 100 and 100x to be evaluated, it is possible to recreate damage in keeping with normal usage. Here, when the particle diameter of the abrasive particles is below 0.3 μm or the particle diameter exceeds 5.0 μm, there is the risk of the optical disks 100 and 100x being erroneously evaluated. More specifically, as one example, when the particle diameter of the particles of the abrasive tape 200 used during the rubbing process was changed for the case where the recording process, the rubbing process, the reading process, and the evaluating process were carried out in the mentioned order on the optical disks 100A and 100Ax described above, as shown in FIG. 12, it was possible to evaluate ten optical disks 100A as all being non-defective and to evaluate ten optical disks 100Ax as all being defective when the particle diameter was in the range of 0.3 μm to 5.0 μm, inclusive.

On the other hand, when the particle diameter of the particles of the abrasive tape 200 used during the rubbing process was set at 0.1 μm, all of the ten optical disks 100A were evaluated as non-defective but two out of the ten optical disks 100Ax were erroneously evaluated as non-defective. Here, it is believed that when the particle diameter of the particles used for the abrasive tape 200 are excessively small, the extent of damage that is produced by rubbing the abrasive tape 200 will also be too small (one example of damage that is not in keeping with normal usage). Accordingly, it is preferable to use particles with a particle diameter of 0.3 μm or greater for the dry abrasive member used during the rubbing process for the present invention.

On the other hand, when the particle diameter of the particles of the abrasive tape 200 used during the rubbing process was set at 9.0 μm, two out of the ten optical disks 100A were erroneously evaluated as defective. Also, tracking was not possible for all ten optical disks 100Ax due to large noise being superimposed on the tracking error signal at the position corresponding to the region A1, and therefore the evaluation recording data Dd could not be read. That is, it is believed that when the particle diameter is 9.0 μm, damage is produced even for the optical disks 100A on which the protective layer 150 is formed and for which reading errors should not occur even when damage in keeping with normal usage has occurred, and that damage which is so great that the evaluation recording data Dd cannot be read occurs for the optical disks 100Ax on which the protective layer 150 is not formed (another example of damage that is not in keeping with normal usage). Accordingly, it is preferable to use particles with a particle diameter of 5.0 μm or below for the dry abrasive member used during the rubbing process for the present invention.

Next, another evaluating method for the optical disks 100 and 100x using the disk evaluating system 1 will be described with reference to the drawings. Note that procedures that are the same as the evaluating method described above (i.e., a method where the abrasive tape 200 is rubbed in the radial direction of the optical disks 100 and 100x during the rubbing process), the respective component elements of the disk evaluating system 1, and the optical disks 100 and 100x have been assigned the same reference numerals and duplicated description thereof is omitted.

In the evaluating method described below, aside from the difference in the direction in which the abrasive tape 200 rubs the optical disks 100 and 100x to be evaluated (i.e., the direction in which the optical disks 100 and 100x reciprocally move relative to the abrasive tape 200), the various processes are carried out with the same procedure and the same conditions as the evaluating method of the optical disks 100 and 100x described earlier. First, when evaluating the read characteristics of the data due to damage to the data recording surface, the reading process and the evaluating process for the present invention are carried out in the mentioned order after carrying out the rubbing process for the present invention on the optical disks 100 and 100x on which the data has been recorded. In this case, the recording process for the present invention is carried out on the recordable optical disks 100A, 100Ax, 100B, and 100Bx before the rubbing process.

Figure 13:
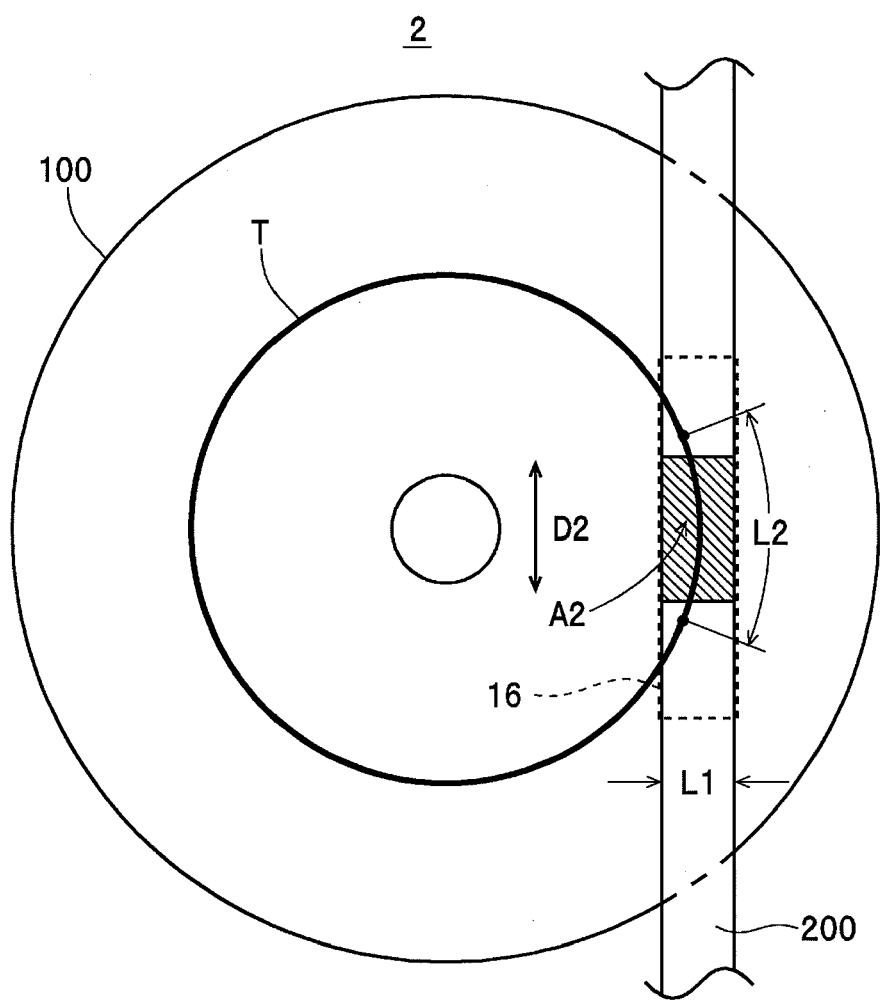
FIG. 13 is a plan view of an optical disk that is useful in explaining a different region rubbed by the abrasive tape.

Next, the rubbing process for the present invention is carried out by the abrasion tester 2 on the respective optical disks 100 and 100x. When doing so, as shown in FIG. 2, first the optical disk 100A for example is held by the disk holding part 2a with the data recording surface facing downward. Next, the weight 14 is slid on the arm 13 to adjust the pressing force applied to the rotation shaft 16a of the roller 16 in the direction of the arrow B to 5.0N. By doing so, the abrasive tape 200 is pressed onto the data recording surface of the optical disk 100A held by the disk holding part 2a with a pressing force of 5.0N. When doing so, as shown in FIG. 13, as one example, the abrasive tape 200 is placed in contact with a data recording track T in a central periphery out of the plurality of data recording tracks on the optical disk 100A.

Next, the moving mechanism 2c reciprocally moves the disk holding part 2a (the optical disk 100A) with respect to the tape pressing part 2b (the abrasive tape 200) in the direction of the arrow D2 (i.e., a tangential direction for the data recording track T of the optical disk 100A). When doing so, the moving mechanism 2c reciprocally moves the disk holding part 2a (the optical disk 100A) five times at a speed where the disk holding part 2a reciprocally moves once over a distance of 30 mm in 1.5 seconds. The tape feeding mechanism 17 feeds the abrasive tape 200 at a speed whereby the roller 16 is caused to rotate by 9 degrees per reciprocal movement of the disk holding part 2a by the moving mechanism 2c. By doing so, whenever the optical disk 100A reciprocally moves against the abrasive tape 200, a new abrasive surface of the abrasive tape 200 will rub against the data recording surface of the optical disk 100A. As a result, as shown in FIG. 13, the abrasive tape 200 is rubbed against a rectangular region A2 (another example of a "region to be processed" for the present invention) that has a width (i.e., a length in the radial direction) of 10 mm that is equal to the tape width L1 of the abrasive tape 200 and a length in the circumferential direction (in this example, a length in a tangential direction for the data recording track T) of 20 mm. By doing so, the rubbing process on the optical disk 100A is completed. After this, the rubbing process is carried out on the optical disks 100Ax, 100B, 100Bx, 100C, and 100Cx in the same way as the optical disk 100A described above.

Next, the reading process that reads the evaluation recording data Dd from the respective optical disks 100 and 100x for which the rubbing process has been completed using the recording/reproducing apparatus 3 and the evaluating process on the respective optical disks 100 and 100x based on the result (i.e., the reading result) of the reading process by the recording/reproducing apparatus 3 are carried out. In this case, with the disk evaluating system 1, during the rubbing process that rubs the abrasive tape 200 using the abrasion tester 2 described earlier, the abrasive tape 200 is rubbed onto one region A2 per revolution of the optical disk 100A with a width in the radial direction of the optical disk 100A of around 10 mm (a length corresponding to the tape width L1 of the abrasive tape 200) and a length in the circumferential direction of 20 mm. Accordingly, unlike the conventional evaluating method that rubs an abrasion wheel for an entire revolution of the optical disk to be evaluated, it is possible to read the evaluation recording data Dd without a situation occurring where tracking on the optical disk 100A is no longer possible after the rubbing process. Therefore, the recording/reproducing apparatus 3 generates the reproduction signal S3 based on the evaluation recording data Dd read from the data recording track T in the central periphery of the optical disk 100A and outputs the reproduction signal S3 to the control unit 22 of the control apparatus 4.

In response, the control unit 22 finds the SER (Symbol Error Rate) based on the reproduction signal S3 outputted from the recording/reproducing apparatus 3 and evaluates the reading characteristics (reproduction characteristics) for the data of the optical disk 100A after the rubbing process based on the calculated SER and the evaluation standard data Da (the evaluation standard data for the rewritable optical disks 100A and 100Ax) stored in the storage unit 23. When doing so, the SER of the optical disk 100A on which the protective layer 150 is formed and is therefore resistant to damage is below the standard value. Accordingly, the control unit 22 evaluates the optical disk 100A as a medium that is resistant to damage or a medium from which data can be read even when damage has occurred and displays a message showing the same on the display unit 21. By doing so, the evaluating of the optical disk 100A is completed. Next, in the same way as the optical disk 100A described above, the reading process and evaluating process are carried out for the optical disk 100Ax. When doing so, the SER of the optical disk 100Ax on which the protective layer 150 is not formed and is therefore susceptible to damage is equal to or above the standard value. Accordingly, the control unit 22 evaluates the optical disk 100Ax as a medium that is susceptible to damage or a medium from which data is difficult to read when damage has occurred and displays a message showing the same on the display unit 21. By doing so, the evaluating of the optical disk 100Ax is completed.

After this, the reading process for the evaluation recording data Dd and the evaluating process are carried out for the optical disks 100B, 100Bx, 100C, and 100Cx in the same way as for the optical disks 100A and 100Ax described above. During the evaluating process for the optical disks 100B and 100Bx, the evaluation standard data Db (evaluation standard data for the write-once optical disks 100B and 100Bx) is used instead of the evaluation standard data Da described above. Similarly, during the evaluating process for the optical disks 100C and 100Cx, the evaluation standard data Dc (evaluation standard data for the read-only optical disks 100C and 100Cx) is used instead of the evaluation standard data Da described above. By doing so, the optical disks 100B and 100C on which the protective layer 150 is formed are evaluated as media that are resistant to damage or media from which data can be read even when damage has occurred and the optical disks 100Bx and 100Cx on which the protective layer 150 is not formed are evaluated as media that are susceptible to damage or media from which data is difficult to read when damage has occurred. In this way, the evaluating of the respective optical disks 100 and 100x by the information medium evaluating method according to the present invention is completed.

On the other hand, when evaluating the recording characteristics for data due to damage on the data recording surface for the recordable optical disks 100A, 100Ax, 100B, and 100Bx, the rubbing process for the present invention is carried out on the optical disks 100A, 100Ax, 100B, and 100Bx in a state where data is yet to be recorded and then the recording process, the reading process, and the evaluating process for the present invention are carried out in the mentioned order. More specifically, first the abrasive tape 200 is rubbed against the respective optical disks 100A, 100Ax, 100B, and 100Bx according to the same procedure and the same conditions as the rubbing process described above. As a result, as shown in FIG. 13, the abrasive tape 200 is rubbed against a region A2 (one example of the "region to be processed" for the present invention) whose width in the radial direction is 10 mm and whose length in the circumferential direction (i.e., a length in a tangential direction for the data recording track T)) is 20 mm on each of the optical disks 100A, 100Ax, 100B, and 100Bx.

Next, the recording process is carried out for each of the optical disks 100A, 100Ax, 100B, and 100Bx for which the rubbing process has been completed. When doing so, the evaluation recording data Dd is recorded onto the respective optical disks 100A, 100Ax, 100B, and 100Bx according to the same procedure and the same conditions as the recording process described earlier. In the disk evaluating system 1, during the rubbing process that rubs the abrasive tape 200 using the abrasion tester 2 described earlier, the abrasive tape 200 is rubbed onto one region A2 per revolution of the optical disk 100A with a length in the circumferential direction of the optical disk 100A of around 20 mm (one example of a value in the range of 5 mm to 30 mm inclusive for the present invention). Accordingly, unlike the conventional evaluating method that rubs an abrasion wheel around an entire revolution of the optical disk to be evaluated, it will be possible to record the evaluation recording data Dd without a situation occurring where tracking cannot be carried out for the optical disks 100 and 100x after the rubbing process.

Next, the reading process that reads the evaluation recording data Dd from the respective optical disks 100A, 100Ax, 100B, and 100Bx for which the recording process has been completed and the evaluating process for the respective optical disks 100A, 100Ax, 100B, and 100Bx based on the results (i.e., the reading results) of the reading process by the recording/reproducing apparatus 3 are carried out. When doing so, the evaluation recording data Dd is read from the optical disks 100A, 100Ax, 100B, and 100Bx according to the same procedure and the same conditions as the reading process described earlier and the optical disks 100A, 100Ax, 100B, and 100Bx are evaluated as defective or non-defective according to the same procedure and the same conditions as the evaluating process described earlier.

When doing so, the SER of the optical disks 100A and 100B on which the protective layer 150 is formed and which are therefore resistant to damage is below the standard value. Accordingly, the control unit 22 evaluates the optical disks 100A and 100B as media that are resistant to damage or media on which data can be recorded even when damage has occurred, and displays a message showing the same on the display unit 21. On the other hand, the SER of the optical disks 100Ax and 100Bx on which the protective layer 150 is not formed and which are therefore susceptible to damage is equal to or above the standard value. Accordingly, the control unit 22 evaluates the optical disks 100Ax and 100Bx as media that are susceptible to damage or media onto which data is difficult to record when damage has occurred, and displays a message showing the same on the display unit 21. By doing so, the evaluating of the optical disks 100A, 100Ax, 100B, and 100Bx (i.e., the evaluating of the respective optical disks 100 and 100x according to the information medium evaluating method according to the present invention) is completed.

Next, the relationship between the length in the circumferential direction (i.e., the length in the tangential direction for the data recording track T) of the region A2 rubbed by the abrasive tape 200 during the rubbing process for the present invention and the evaluation results for the optical disks 100 and 100x will be described with reference to the drawings.

Since as described earlier, the abrasive tape 200 is rubbed onto only part of a region in the circumferential direction (i.e., along the data recording tracks) of the respective optical disks 100 and 100x to be evaluated, unlike the conventional method where the abrasion wheel is rubbed for an entire revolution of the optical disk to be evaluated, it is possible to record the evaluation recording data Dd and read the evaluation recording data Dd without a situation occurring where tracking is not possible during the recording process and/or the reading process. Here, the present applicant found that it is preferable for the length in the circumferential direction of the region A2 rubbed by the abrasive tape 200 during the rubbing process for the present invention to be 30 mm or below. Note that since the length in the circumferential direction of the region A2 is determined in accordance with the distance by which the abrasive tape 200 reciprocally moves with respect to the optical disks 100 and 100x, it is difficult to set the length in the circumferential direction of the region A2 at 5 mm or below due to the inability for the abrasion tester 2 to reciprocally move the abrasive tape 200 over an extremely short distance.

When the length in the circumferential direction of the region A2 described above was changed by changing the distance by which the optical disk 100A reciprocally moves relative to the abrasive tape 200 used during the rubbing process for the case where the recording process, the rubbing process, the reading process, and the evaluating process were carried out in the mentioned order on the optical disk 100A described above, as shown in FIG. 14, it was possible to evaluate ten optical disks 100A as all being non-defective and to evaluate ten optical disks 100Ax as all being defective when the length in the circumferential direction of the region A2 was 30 mm or below. On the other hand, when the length in the circumferential direction of the region A2 was set at 40 mm, all of the optical disks 100Ax were evaluated as defective but one out of the ten optical disks 100A was erroneously evaluated as defective. Similarly, when the length in the circumferential direction of the region A2 was set at 50 mm, all of the optical disks 100Ax were evaluated as defective but two out of the ten optical disks 100A were erroneously evaluated as defective.

Similarly, when the length in the circumferential direction of the region A2 described above was changed for the case where the recording process, the rubbing process, the reading process, and the evaluating process were carried out in the mentioned order on the optical disk 100B described above, as shown in FIG. 15, it was possible to evaluate ten optical disks 100B as all being non-defective and to evaluate ten optical disks 100Bx as all being defective when the length in the circumferential direction of the region A2 was 30 mm or below. On the other hand, when the length in the circumferential direction of the region A2 was set at 40 mm, all of the optical disks 100Bx were evaluated as defective but one out of the ten optical disks 100B was erroneously evaluated as defective. Similarly, when the length in the circumferential direction of the region A2 was set at 50 mm, all of the optical disks 100Bx were evaluated as defective but two out of the ten optical disks 100B were erroneously evaluated as defective.

In addition, when the length in the circumferential direction of the region A2 described above was changed for the case where the rubbing process, the reading process, and the evaluating process were carried out in the mentioned order on the optical disk 100C described above, as shown in FIG. 16, it was possible to evaluate ten optical disks 100C as all being non-defective and to evaluate ten optical disks 100Cx as all being defective when the length in the circumferential direction of the region A2 was 30 mm or below. On the other hand, when the length in the circumferential direction of the region A2 was set at 40 mm, all of the optical disks 100Cx were evaluated as defective but one out of the ten optical disks 100C was erroneously evaluated as defective. Similarly, when the length in the circumferential direction of the region A2 was set at 50 mm, all of the optical disks 100Cx were evaluated as defective but two out of the ten optical disks 100C were erroneously evaluated as defective.

Also, when the length in the circumferential direction of the region A2 described above was changed for the case where the rubbing process, the recording process, the reading process, and the evaluating process were carried out in the mentioned order on the optical disk 100A described above, as shown in FIG. 17, it was possible to evaluate ten optical disks 100A as all being non-defective and to evaluate ten optical disks 100Ax as all being defective when the length in the circumferential direction of the region A2 was 30 mm or below. On the other hand, when the length in the circumferential direction of the region A2 was set at 40 mm, all of the optical disks 100Ax were evaluated as defective but one out of the ten optical disks 100A was erroneously evaluated as defective. Similarly, when the length in the circumferential direction of the region A2 was set at 50 mm, all of the optical disks 100Ax were evaluated as defective but two out of the ten optical disks 100A were erroneously evaluated as defective.

Also, when the length in the circumferential direction of the region A2 described above was changed for the case where the rubbing process, the recording process, the reading process, and the evaluating process were carried out in the mentioned order on the optical disk 100B described above, as shown in FIG. 18, it was possible to evaluate ten optical disks 100B as all being non-defective and to evaluate ten optical disks 100Bx as all being defective when the length in the circumferential direction of the region A2 was 30 mm or below. On the other hand, when the length in the circumferential direction of the region A2 was set at 40 mm, all of the optical disks 100Bx were evaluated as defective but one out of the ten optical disks 100B was erroneously evaluated as defective. Similarly, when the length in the circumferential direction of the region A2 was set at 50 mm, all of the optical disks 100Bx were evaluated as defective but two out of the ten optical disks 100B were erroneously evaluated as defective.

Here, when the length in the circumferential direction of the region A2 (i.e., the length along the data recording track T) exceeds 30 mm, it is believed that tracking errors will occur during the recording process and/or reading process. For this reason, it is preferable for the length in the circumferential direction of the region A2 (the length of the region A2 in the direction of the data recording track T for which the recording process and the reading process are carried out) should preferably be the length L2 (i.e., 30 mm) shown in FIG. 13 or below, and the distance by which the optical disks 100 and 100x reciprocally move relative to the abrasive tape 200 should preferably be set so as not to exceed 30 mm.

Next, the relationship between the particle diameter of the particles of the used abrasive tape 200 and the evaluation results for the optical disks 100 and 100x for the case where the processing member and the information medium are reciprocally moved in a tangential direction for the data recording tracks during the rubbing process for the present invention will be described with reference to the drawings.

As described earlier, by rubbing the abrasive tape 200 that has particles with a particle diameter in a range of 0.3 μm to 5.0 μm, inclusive (in this example, $Al_2O_3$ with a particle diameter of 0.6 μm) onto the optical disks 100 and 100x to be evaluated, it is possible to recreate damage in keeping with normal usage. Here, when the particle diameter of the abrasive particles is below 0.3 μm or the particle diameter exceeds 5.0 μm, there is the risk of the optical disks 100 and 100x being erroneously evaluated. More specifically, as one example, when the particle diameter of the particles of the abrasive tape 200 used during the rubbing process was changed for the case where the recording process, the rubbing process, the reading process, and the evaluating process were carried out in the mentioned order on the optical disks 100A and 100Ax described above, for example, as shown in FIG. 19, it was possible to evaluate ten optical disks 100A as all being non-defective and to evaluate ten optical disks 100Ax as all being defective when the particle diameter was in the range of 0.3 μm to 5.0 μm, inclusive.

On the other hand, when the particle diameter of the particles of the abrasive tape 200 used during the rubbing process was set at 0.1 μm, all of the ten optical disks 100A were evaluated as non-defective but two out of the ten optical disks 100Ax were erroneously evaluated as non-defective. Here, it is believed that when the particle diameter of the particles used for the abrasive tape 200 are excessively small, the extent of damage that is produced by rubbing the abrasive tape 200 will also be too small (one example of damage that is not in keeping with normal usage). Accordingly, it is preferable to use particles with a particle diameter of 0.3 μm or greater for the dry abrasive member used during the rubbing process for the present invention.

On the other hand, when the particle diameter of the particles of the abrasive tape 200 used during the rubbing process was set at 9.0 μm, two out of the ten optical disks 100A were erroneously evaluated as defective. Also, tracking was not possible for all ten optical disks 100Ax due to large noise being superimposed on the tracking error signal at positions corresponding to the regions A2, and therefore the evaluation recording data Dd could not be read. That is, it is believed that when the particle diameter is 9.0 μm, damage is produced even for the optical disks 100A on which the protective layer 150 is formed and for which reading errors should not occur even when damage in keeping with normal usage has occurred, and that damage which is so great that the evaluation recording data Dd cannot be read occurs for the optical disks 100Ax on which the protective layer 150 is not formed (another example of damage that is not in keeping with normal usage). Accordingly, it is preferable to use particles with a particle diameter of 5.0 μm or below for the dry abrasive member used during the rubbing process for the present invention.

In this way, according to the method of evaluating the optical disks 100 and 100x using the disk evaluating system 1, when carrying out the recording process, the rubbing process, the reading process, and the evaluating process for the present invention in the mentioned order to evaluate the recordable (i.e., rewritable and write-once) optical disks 100A, 100Ax, 100B, and 100Bx, by rubbing the abrasive tape 200 as a processing member against only part of a region in the circumferential direction of the optical disks 100 and 100x during the rubbing process, it is possible to produce damage that is in keeping with normal usage of the recordable optical disks 100 and 100x to be evaluated. Accordingly, it is possible to properly evaluate whether the optical disks 100 and 100x to be evaluated are media that are susceptible to damage, whether such disks are media where the reading characteristics for the data still satisfy a predetermined standard when damage has occurred, and the like.

Also, according to the method of evaluating the optical disks 100 and 100x using the disk evaluating system 1, when carrying out the rubbing process, the recording process, the reading process, and the evaluating process for the present invention in the mentioned order to evaluate the recordable (i.e., rewritable and write-once) optical disks 100A, 100Ax, 100B, and 100Bx, by rubbing the abrasive tape 200 as a processing member against only part of a region in the circumferential direction of the optical disks 100 and 100x during the rubbing process, it is possible to produce damage that is in keeping with normal usage of the recordable optical disks 100 and 100x to be evaluated. Accordingly, it is possible to properly evaluate whether the optical disks 100 and 100x to be evaluated are media that are susceptible to damage, whether such disks are media where the recording characteristics for the data still satisfy a predetermined standard when damage has occurred, and the like.

In this way, according to the method of evaluating the optical disks 100 and 100x using the disk evaluating system 1, when carrying out the rubbing process, the reading process, and the evaluating process for the present invention in the mentioned order to evaluate the read-only optical disks 100C and 100Cx, by rubbing the abrasive tape 200 as a processing member against only part of a region in the circumferential direction of the optical disks 100C and 100Cx during the rubbing process, it is possible to produce damage that is in keeping with normal usage of the read-only optical disks 100C and 100Cx to be evaluated. Accordingly, it is possible to properly evaluate whether the optical disks 100C and 100Cx to be evaluated are media that are susceptible to damage, whether such disks are media where the reading characteristics for the data still satisfy a predetermined standard when damage has occurred, and the like.

In addition, according to the method of evaluating the optical disks 100 and 100x using the disk evaluating system 1, by rubbing the processing member (the abrasive tape 200) onto a region to be processed (in this example, the region A1 whose length along the data recording track T is 10 mm) whose length in the circumferential direction (i.e., the length along the data recording track T) is in a range of 5 mm to 30 mm, inclusive as "only part of a region in the circumferential direction" for the present invention, it is possible to avoid a situation where fluctuations occur in the extent of rubbing (i.e., the extent of abrasion) due to the width of the processing member being too narrow and to avoid a situation where large noise is superimposed on the tracking error signal during the recording process and the reading process due to damage to a wider area than would occur in normal usage, and therefore possible to achieve the reliable recording of the evaluation recording data Dd during the recording process and the reliable reading of the evaluation recording data Dd during the reading process. This means that it is possible to properly evaluate whether the optical disks 100 and 100x to be evaluated are defective or non-defective.

Also, according to the method of evaluating the optical disks 100 and 100x using the disk evaluating system 1, by rubbing the processing member (the abrasive tape 200) onto one region to be processed (the region A1 or A2) per revolution of the optical disk 100, it is possible to avoid a situation where large noise is superimposed on the tracking error signal during the recording process and the reading process due to the abrasive tape 200 being rubbed onto a plurality of regions A1 per revolution of the data recording tracks, and therefore possible to achieve the reliable recording of the evaluation recording data Dd during the recording process and the reliable reading of the evaluation recording data Dd during the reading process. This means that it is possible to properly evaluate whether the optical disks 100 and 100x to be evaluated are defective or non-defective.

In addition, according to the method of evaluating the optical disks 100 and 100x using the disk evaluating system 1, by rubbing a processing member onto the data recording surface by reciprocally moving at least one (in the above example, only the optical disk 100 or 100x) out of the optical disk 100 or 100x and the processing member (the abrasive tape 200) to cause the processing member to move relative to the optical disk 100 or 100x in the radial direction of the optical disk 100 or 100x during the rubbing process, it is possible to evaluate the optical disks 100 and the like in keeping with actual usage of the optical disks 100 and the like where damage occurs in a direction that intersects the data recording tracks T.

According to the method of evaluating the optical disks 100 and 100x using the disk evaluating system 1, by rubbing the processing member onto the data recording surface by reciprocally moving at least one (in the above example, only the optical disk 100 or 100x) out of the optical disk 100 or 100x and the processing member (the abrasive tape 200) to cause the processing member to move relative and tangentially to the data recording tracks during the rubbing process, it is possible to evaluate the optical disks 100 and the like in keeping with actual usage of the optical disks 100 and the like where long scratches are produced along the data recording tracks T.

According to the method of evaluating the optical disks 100 and 100x using the disk evaluating system 1, by causing relative movement by reciprocally moving at least one (in the above example, the optical disk 100 or 100x) out of the optical disk 100 or 100x and the processing member (the abrasive tape 200) at a speed where one reciprocal movement over a distance of 30 mm takes 1 to 2 seconds, inclusive, it is possible to avoid a situation where the reciprocal movement speed is too low and it is not possible to recreate damage in keeping with normal usage, and a situation where the reciprocal movement speed is too high and damage in excess of normal usage is produced.

Also, according to the method of evaluating the optical disks 100 and 100x using the disk evaluating system 1, by reciprocally moving at least one (in the above example, the optical disk 100 or 100x) out of the optical disk 100 or 100x and the processing member (the abrasive tape 200) between three and ten times, inclusive during the rubbing process for the present invention, it is possible to avoid a situation where the number of reciprocal movements is too low and it is not possible to recreate damage in keeping with normal usage, and a situation where the number of reciprocal movements is too high and damage in excess of normal usage is produced.

Also, according to the method of evaluating the optical disks 100 and 100x using the disk evaluating system 1, by rubbing the processing member (the abrasive tape 200) against the lower side of the optical disk 100 or 100x during the rubbing process for the present invention, fragments produced during rubbing will naturally fall off the optical disk 100 or 100x. Accordingly, it is possible to avoid a situation where fluctuations occur in the degree of abrasion between different optical disks 100 and 100x to be evaluated due to the adhesion of fragments.

Also, according to the method of evaluating the optical disks 100 and 100x using the disk evaluating system 1, by using a dry abrasive member (the abrasive tape 200) with a plurality of particles with a particle diameter in a range of 0.3 μm to 5.0 μm, inclusive as the processing member for the present invention, it is possible to avoid a situation where it is not possible to recreate damage in keeping with normal usage due to a dry abrasive member with particles of excessively small diameter being used and a situation where damage in excess of normal usage is produced due to a dry abrasive member with particles of excessively large diameter being used.

In addition, according to the method of evaluating the optical disks 100 and 100x using the disk evaluating system 1, since a dry abrasive member that includes $Al_2O_3$ as particles is inexpensive, it is possible to reduce the cost required to evaluate the optical disks 100 and 100x. Also, since it is easy to obtain a dry abrasive member that uses $Al_2O_3$ as particles, unlike the case where a dry abrasive member that uses difficult-to-obtain particles is used, it is possible for a large number of users to carry out the rubbing process with the same conditions.

In addition, according to the method of evaluating the optical disks 100 and 100x using the disk evaluating system 1, by using a tape-shaped abrasive member (the abrasive tape 200) as the dry abrasive member and feeding the abrasive tape 200 at a predetermined speed during the rubbing process, it is possible to prevent the dry abrasive member from becoming clogged due to fragments. Accordingly, it is possible to avoid a situation where there are fluctuations in the degree of abrasion between different optical disks 100 and 100x due to clogging, and therefore it is possible to properly evaluate whether the optical disks 100 and 100x are defective or non-defective.

Also, according to the method of evaluating the optical disks 100 and 100x using the disk evaluating system 1, by pressing the dry abrasive member (the abrasive tape 200) onto the data recording surface using the roller 16 whose diameter is in a range of 40 mm to 60 mm, inclusive, it is possible to avoid a situation where the optical disk 100 or 100x to be evaluated is badly damaged in excess of normal usage due to the abrasive tape 200 being pressed by a roller with an excessively small diameter and a situation where the roller gets in the way due to the abrasive tape 200 being pressed by a roller with an excessively large diameter on a small information medium (in this example, the optical disks 100 and 100x) with a diameter in a range of several cm to several tens of cm, which would make it difficult to achieve reciprocal movement over a sufficient distance.

Also, according to the method of evaluating the optical disks 100 and 100x using the disk evaluating system 1, by applying a pressing force in a range of 1.0N to 30.0N, inclusive to the roller in a direction that presses the dry abrasive member (the abrasive tape 200) onto the data recording surface, it is possible to avoid a situation where it is not possible to recreate damage in keeping with normal use due to the force applied to the abrasive tape 200 being too weak and to avoid a situation where the optical disks 100 and 100x to be evaluated are badly damaged in excess of normal usage due to the force applied to the abrasive tape 200 being too large.

In addition, according to the method of evaluating the optical disks 100 and 100x using the disk evaluating system 1, by evaluating the optical disk 100 during the evaluating process for the present invention based on the SER as one example of an error rate as a "reading result" for the present invention and evaluation standard data for an evaluating process based on a SER, it is possible to suitably evaluate the optical disk 100 in keeping with operation of an actual drive apparatus, and as a result, it is possible to accurately and easily determine whether error correction is possible or impossible.

In addition, according to the method of evaluating the optical disks 100 and 100x using the disk evaluating system 1, by evaluating, as an information medium for the present invention, an optical disk (the optical disks 100A to 100C) on which the data recording surface for the present invention is constructed of layers of light transmitting resin (in this example, the light-transmitting layer 140 and the protective layer 150) formed so as to cover the recording portion for data (in this example, the recording layers 130A and 130B of the optical disks 100A and 100B and the surface of the disk substrate 110C of the optical disk 100C), it is possible to provide high-quality optical disks that will be evaluated as being non-defective when evaluating is carried out with conditions in keeping with normal usage.

Note that the present invention is not limited to the construction and the method described above. For example, although the abrasive tape 200 that includes $Al_2O_3$ as particles is used during the rubbing process for the present invention in the method of evaluating that uses the disk evaluating system 1 described above, the processing member for the present invention is not limited to this and it is possible to use various abrasive members such as sandpaper or a grindstone or to use a cloth material such as canvas, microfiber cloth, nonwoven cloth, and denim. Also, although the abrasive tape 200 is rubbed as the processing member onto one region A1 or A2 per revolution of the optical disks 100 and 100x according to the evaluating method that uses the disk evaluating system 1 described above, the abrasive tape 200 may be rubbed as the processing member onto a plurality of regions A1 and A2 per revolution of the optical disks 100 and 100x.

In addition, for the disk evaluating system 1 (the abrasion tester 2) described above, although a construction is used where the disk holding part 2a (the optical disk 100 or 100x) is reciprocally moved in the radial direction of the optical disk 100 or 100x or in a tangential direction for the data recording track T, it is also possible to use a construction where not only the disk holding part 2a but also the tape pressing part 2b (the processing member such as the abrasive tape 200) is reciprocally moved in the radial direction of the optical disk 100 or 100x or in a tangential direction for the data recording track T or a construction where the disk holding part 2a is held still and only the tape pressing part 2b (the processing member such as the abrasive tape 200) is reciprocally moved in the radial direction of the optical disk 100 or 100x or in a tangential direction for the data recording track T.

As another example, it is also possible to use a construction that carries out the rubbing process for the present invention by pressing a cylindrical processing member attached to the tip of an electric drill onto the data recording surface of the optical disk 100 or 100x while rotating the processing member using the electric drill. When this construction is used, by setting the size of the contact surface between the processing member and the medium to be evaluated in the range of 5 mm to 30 mm, inclusive, during the rubbing process that rubs the abrasive tape 200 described earlier, it is possible to set the length in the circumferential direction (in more detail, the length of the diameter in the tangential direction for the data recording track T) of the region corresponding to the region A1 or A2 (i.e., the region that is rubbed by the processing member) in the range of 5 mm to 30 mm, inclusive.

In addition, with the evaluating method that uses the disk evaluating system 1 described above, although the optical disks 100 and 100x are evaluated during the evaluating process by finding the SER and comparing the SER with the evaluation standard data Da to Dc, it is possible to carry out evaluating based on various error rates such as a BER (Bit Error Rate) in place of the SER. In addition, during the evaluating process for the present invention, it is possible to evaluate the optical disk 100 based on the BER as the reading result for the present invention and evaluation standard data for an evaluating process based on the BER, and with this construction, it is possible to properly evaluate whether the optical disks 100 and 100x to be evaluated are media that are susceptible to damage, whether such disks are media where the reading characteristics for data still satisfy a predetermined standard when damage has occurred, and the like.

The objects (i.e., the "information medium" for the present invention) evaluated by the information medium evaluating method according to the present invention are not limited to information media like the optical disks 100 described above and includes various types of information media such as magneto-optical information media and magnetic recording media.

What is claimed is:

1. An information medium evaluating method comprising, in the following order:
   a recording process that records data onto a recordable information medium to be evaluated;
   a rubbing process that rubs a processing member against a data recording surface of the information medium;
   a reading process that reads the data from the information medium; and
   an evaluating process that evaluates the information medium based on a result of the reading process and evaluation standard data,
   wherein during the rubbing process, the processing member is rubbed onto only as region spanning less than a circumference of the information medium.

2. An information medium evaluating method comprising, in the following order:

a rubbing process that rubs a processing member against a data recording surface of a recordable information medium to be evaluated;

a recording process that records data onto the information medium;

a reading process that reads the data from the information medium; and an evaluating process that evaluates the information medium based on a result of the reading process and evaluation standard data, wherein during the rubbing process, the processing member is rubbed onto only a region spanning less than a circumference of the information medium.

3. An information medium evaluating method comprising, in the following order:

a rubbing process that rubs a processing member against a data recording surface of a read-only information medium to be evaluated;

a reading process that reads data from the information medium; and an evaluating process that evaluates the information medium based on a result of the reading process and evaluation standard data, wherein during the rubbing process, the processing member is rubbed onto only a region spanning less than a circumference of the information medium.

4. An information medium evaluating method according to claim 1, wherein the length of the region in the circumferential direction of the information medium is from 5 mm to 30 mm, inclusive.

5. An information medium evaluating method according to claim 2, wherein the length of the region in the circumferential direction of the information medium is from 5 mm to 30 mm, inclusive.

6. An information medium evaluating method according to claim 3, wherein the length of the region in the circumferential direction of the information medium is from 5 mm to 30 mm, inclusive.

7. An information medium evaluating method according to claim 4, wherein the processing member is rubbed onto one region to be processed per revolution of the information medium.

8. An information medium evaluating method according to claim 5, wherein the processing member is rubbed onto one region to be processed per revolution of the information medium.

9. An information medium evaluating method according to claim 6, wherein the processing member is rubbed onto one region to be processed per revolution of the information medium.

10. An information medium evaluating method according to claim 1, wherein during the rubbing process, the processing member is rubbed onto the data recording surface by reciprocally moving at least one of the information medium and the processing member to cause the processing member to move relative to the information medium in a radial direction.

11. An information medium evaluating method according to claim 2, wherein during the rubbing process, the processing member is rubbed onto the data recording surface by reciprocally moving at least one of the information medium and the processing member to cause the processing member to move relative to the information medium in a radial direction.

12. An information medium evaluating method according to claim 3, wherein during the rubbing process, the processing member is rubbed onto the data recording surface by reciprocally moving at least one of the information medium and the processing member to cause the processing member to move relative to the information medium in a radial direction.

13. An information medium evaluating method according to claim 1, wherein during the rubbing process, the processing member is rubbed onto the data recording surface by reciprocally moving at least one of the information medium and the processing member to cause the processing member to move relative and tangentially to a data recording track on the information medium.

14. An information medium evaluating method according to claim 2, wherein during the rubbing process, the processing member is rubbed onto the data recording surface by reciprocally moving at least one of the information medium and the processing member to cause the processing member to move relative and tangentially to a data recording track on the information medium.

15. An information medium evaluating method according to claim 3, wherein during the rubbing process, the processing member is rubbed onto the data recording surface by reciprocally moving at least one of the information medium and the processing member to cause the processing member to move relative and tangentially to a data recording track on the information medium.

16. An information medium evaluating method according to claim 10, wherein at least one of the information medium and the processing member is reciprocally moved relative to one another such that one reciprocal movement over a distance of 30 mm takes one to two seconds, inclusive.

17. An information medium evaluating method according to claim 11, wherein at least one of the information medium and the processing member is reciprocally moved relative to one another such that one reciprocal movement over a distance of 30 mm takes one to two seconds, inclusive.

18. An information medium evaluating method according to claim 12, wherein at least one of the information medium and the processing member is reciprocally moved relative to one another such that one reciprocal movement over a distance of 30 mm takes one to two seconds, inclusive.

19. An information medium evaluating method according to claim 13, wherein at least one of the information medium and the processing member is reciprocally moved relative to one another such that one reciprocal movement over a distance of 30 mm takes one to two seconds, inclusive.

20. An information medium evaluating method according to claim 14, wherein at least one of the information medium and the processing member is reciprocally moved relative to one another such that one reciprocal movement over a distance of 30 mm takes one to two seconds, inclusive.

21. An information medium evaluating method according to claim 15,
wherein at least one of the information medium and the processing member is reciprocally moved relative to one another such that one reciprocal movement over a distance of 30 mm takes one to two seconds, inclusive.

22. An information medium evaluating method according to claim 10,
wherein during the rubbing process, at least one of the information medium and the processing member is reciprocally moved in a range of three times to ten times, inclusive.

23. An information medium evaluating method according to claim 11,
wherein during the rubbing process, at least one of the information medium and the processing member is reciprocally moved in a range of three times to ten times, inclusive.

24. An information medium evaluating method according to claim 12,
wherein during the rubbing process, at least one of the information medium and the processing member is reciprocally moved in a range of three times to ten times, inclusive.

25. An information medium evaluating method according to claim 13,
wherein during the rubbing process, at least one of the information medium and the processing member is reciprocally moved in a range of three times to ten times, inclusive.

26. An information medium evaluating method according to claim 14,
wherein during the rubbing process, at least one of the information medium and the processing member is reciprocally moved in a range of three times to ten times, inclusive.

27. An information medium evaluating method according to claim 15,
wherein during the rubbing process, at least one of the information medium and the processing member is reciprocally moved in a range of three times to ten times, inclusive.

28. An information medium evaluating method according to claim 1,
wherein during the rubbing process, the processing member rubs the information medium from below.

29. An information medium evaluating method according to claim 2,
wherein during the rubbing process, the processing member rubs the information medium from below.

30. An information medium evaluating method according to claim 3,
wherein during the rubbing process, the processing member rubs the information medium from below.

31. An information medium evaluating method according to claim 1,
wherein a dry abrasive member including a plurality of particles with a particle diameter in a range of 0.3 μm to 5.0 μm, inclusive is used as the processing member.

32. An information medium evaluating method according to claim 2,
wherein a dry abrasive member including a plurality of particles with a particle diameter in a range of 0.3 μm to 5.0 μm, inclusive is used as the processing member.

33. An information medium evaluating method according to claim 3,
wherein a dry abrasive member including a plurality of particles with a particle diameter in a range of 0.3 μm to 5.0 μm, inclusive is used as the processing member.

34. An information medium evaluating method according to claim 31, wherein $Al_2O_3$ is used as the particles.

35. An information medium evaluating method according to claim 32, wherein $Al_2O_3$ is used as the particles.

36. An information medium evaluating method according to claim 33, wherein $Al_2O_3$ is used as the particles.

37. An information medium evaluating method according to claim 31, wherein in the rubbing process, a tape-shaped abrasive member is used as the dry abrasive member and the tape-shaped abrasive member is fed at a predetermined speed.

38. An information medium evaluating method according to claim 32, wherein in the rubbing process, a tape-shaped abrasive member is used as the dry abrasive member and the tape-shaped abrasive member is fed at a predetermined speed.

39. An information medium evaluating method according to claim 33, wherein in the rubbing process, a tape-shaped abrasive member is used as the dry abrasive member and the tape-shaped abrasive member is fed at a predetermined speed.

40. An information medium evaluating method according to claim 31, wherein the dry abrasive member is pressed using a roller with a diameter in a range of 40 mm to 60 mm, inclusive, onto the data recording surface.

41. An information medium evaluating method according to claim 32, wherein the dry abrasive member is pressed using a roller with a diameter in a range of 40 mm to 60 mm, inclusive, onto the data recording surface.

42. An information medium evaluating method according to claim 33, wherein the dry abrasive member is pressed using a roller with a diameter in a range of 40 mm to 60 mm, inclusive, onto the data recording surface.

43. An information medium evaluating method according to claim 40, wherein a pressing force in a range of 1.0N to 30.0N, inclusive is applied to the roller in a direction in which the roller presses the dry abrasive member onto the data recording surface.

44. An information medium evaluating method according to claim 41, wherein a pressing force in a range of 1.0N to 30.0N, inclusive is applied to the roller in a direction in which the roller presses the dry abrasive member onto the data recording surface.

45. An information medium evaluating method according to claim 42 wherein a pressing force in a range of 1.0N to 30.0N, inclusive is applied to the roller in a direction in which the roller presses the dry abrasive member onto the data recording surface.

46. An information medium evaluating method according to claim 1, wherein during the evaluating process, the information medium is evaluated based on an error rate as the result of the reading process and the evaluation standard data which is for an evaluating process based on the error rate.

47. An information medium evaluating method according to claim 2, wherein during the evaluating process, the information medium is evaluated based on an error rate as the result of the reading process and the evaluation standard data which is for an evaluating process based on the error rate.

48. An information medium evaluating method according to claim 3, wherein during the evaluating process, the information medium is evaluated based on an error rate as the result of the reading process and the evaluation standard data which is for an evaluating process based on the error rate.

49. An information medium evaluating method according to claim 1, wherein an optical disk where the data recording surface is constructed of a layer of a light transmitting resin formed so as to cover a recording portion for the data is evaluated as the information medium.

50. An information medium evaluating method according to claim 2, wherein an optical disk where the data recording surface is constructed of a layer of a light transmitting resin formed so as to cover a recording portion for the data is evaluated as the information medium.

51. An information medium evaluating method according to claim 3, wherein an optical disk where the data recording surface is constructed of a layer of a light transmitting resin formed so as to cover a recording portion for the data is evaluated as the information medium.

* * * * *

UNITED STATES PATENT AND TRADEMARK OFFICE
CERTIFICATE OF CORRECTION

PATENT NO. : 8,295,137 B2
APPLICATION NO. : 11/751193
DATED : October 23, 2012
INVENTOR(S) : K. Yoneyama Page 1 of 1

It is certified that error appears in the above-identified patent and that said Letters Patent is hereby corrected as shown below:

In the claims, column 28, line 52; claim 1, line 64, please change "as region spanning" to --a region spanning--.

Signed and Sealed this
Fifth Day of February, 2013

Teresa Stanek Rea
*Acting Director of the United States Patent and Trademark Office*